US012775075B2

(12) United States Patent
Gilliland

(10) Patent No.: US 12,775,075 B2
(45) Date of Patent: Oct. 27, 2026

(54) QUANTUM DOT DETECTOR ARRAY FOR AUTOMOTIVE LADAR

(71) Applicant: Continental Autonomous Mobility US, LLC, Auburn Hills, MI (US)

(72) Inventor: Patrick B. Gilliland, Santa Barbara, CA (US)

(73) Assignee: AUMOVIO Autonomous Mobility US, LLC, Auburn Hills, MI (US)

(*) Notice: Subject to any disclaimer, the term of this patent is extended or adjusted under 35 U.S.C. 154(b) by 843 days.

(21) Appl. No.: 18/112,008

(22) Filed: Feb. 21, 2023

(65) Prior Publication Data

US 2024/0118396 A1 Apr. 11, 2024

Related U.S. Application Data

(60) Provisional application No. 63/376,248, filed on Sep. 19, 2022.

(51) Int. Cl.

*G01S 7/4863* (2020.01)
*G01S 7/481* (2006.01)
*G01S 17/86* (2020.01)
*G01S 17/89* (2020.01)
*G01S 17/931* (2020.01)

(52) U.S. Cl.

CPC .......... *G01S 7/4863* (2013.01); *G01S 7/4817* (2013.01); *G01S 17/86* (2020.01); *G01S 17/89* (2013.01); *G01S 17/931* (2020.01)

(58) Field of Classification Search

CPC .... G01C 21/28; G01C 21/3697; G01C 21/26; G01C 21/30; G01C 21/12; G01C 21/20; G01C 21/1652; G01C 21/1656; G01C 21/34

USPC .......... 356/4

See application file for complete search history.

(56) References Cited

U.S. PATENT DOCUMENTS

| | | | |
|---|---|---|---|
| 8,804,101 | B2 | 8/2014 | Spagnolia et al. |
| 9,069,080 | B2 | 6/2015 | Stettner et al. |
| 9,915,726 | B2 | 3/2018 | Bailey et al. |
| 10,841,563 | B1 | 11/2020 | Dutta |
| 2002/0020892 | A1 | 2/2002 | Shima |

(Continued)

OTHER PUBLICATIONS

International Search Report and Written Opinion dated Dec. 8, 2023 from corresponding International patent application No. PCT/US2023/033149.

(Continued)

*Primary Examiner* — Masum Billah

(57) ABSTRACT

A vehicular ladar system includes a ladar sensor with a light source configured to generate modulated light. The ladar may be configured to illuminate in one flash the entire scene in the field of view, or may include a scanning mechanism configured to intercept the light generated by the light source and selectively direct the light into a portion of the field of view. A receiving lens assembly receives light reflected off an object in the field of view. A plurality of quantum dot photodiodes are arranged in an array. Each photodiode is configured to receive light from the receiving lens assembly. A readout circuit and a bias circuit are electrically connected to each photodiode. A number of quantum dot film densification methods and apparatus are also described.

20 Claims, 19 Drawing Sheets

(56) References Cited

U.S. PATENT DOCUMENTS

| | | | | |
|---|---|---|---|---|
| 2013/0242283 | A1* | 9/2013 | Bailey | G01S 7/4813 977/734 |
| 2016/0351842 | A1 | 12/2016 | Park et al. | |

OTHER PUBLICATIONS

Linyue Tong et al. "Vapor-phase polymerization of poly(3,4-ethylenedioxythiophene) (PEDOT) on commercial carbon coated aluminum foil as enhanced electrodes for supercapacitors", HRL131 System Architecture, Nov. 30, 2015, [Abstract], vol. 297, www.sciencedirect.com, DOI: 10.1016/j.jpowsour.2015.06.128.

Julio M. D'Arcy et al. "Vapor Phase Polymerization of Nanofibrillar Poly (3,4-ethylenedioxythiophene) for Supercapacitors", Feb. 3, 2014, [Abstract], ACS Nano, vol. 8, Issue 2, ACS Publications, DOI: 10.1021/nn405595r.

Bianca Pistillo et al. "PRAP-CVD: How to design high conformal PEDOT surfaces", Mar. 30, 2017, [Abstract], RSC Advances, Issue 31, DOI: 10.1039/C7RA00343A.

Qisen Xie et al. "Vapor-Phased Polymerized Poly (3,4-Ethylenedioxythiophene) on a Nickel Nanowire Array Film: Aqueous Symmetrical Pseudocapacitors with Superior performance", Nov. 18, 2016, [Abstract], PLOS.One, plos.org, DOI: 10.1371/journal.pone.0166529.

* cited by examiner

QUANTUM DOT DETECTOR ARRAY FOR AUTOMOTIVE LADAR

CROSS-REFERENCE TO RELATED APPLICATIONS

This application claims the benefit of U.S. Provisional Application No. 63/376,248, filed Sep. 19, 2022.

TECHNICAL FIELD

The technical field relates generally to ladar sensors and particularly to quantum dot detectors for ladar sensors.

BACKGROUND

Infrared ("IR") detector arrays are often used to enable the 3D imaging required for level 3 autonomous driving. The material systems for IR LADAR include InGaAs:InP, Ge:Si, and recently, InGaAs:Si. We have previously proposed quantum dots ("QDs") as part of the application for U.S. Pat. No. 9,915,726B2, "Personal LADAR". While QDs have been used in IR still photography and low speed video capture, they are presently lacking some of the high speed performance suitable for LADAR imaging.

The detector systems cited above [InGaAs:InP, Ge:Si, InGaAs:Si] all require a substrate separate from the image readout IC ("ROIC"), which is typically a standard CMOS circuit on silicon. The detector array is then hybridized or mated to the ROIC by the use of metallic bumps, wafer-wafer bonding, or other process designed to provide electrical connection and mechanical stability. In automotive and other vehicular applications, cost and complexity of assembly must be reduced to reach a wider market.

As such, it is desirable to present a quantum dot detector array which can enable a single substrate ladar imaging sensor to be produced in high volume at low cost. In addition, other desirable features and characteristics will become apparent from the subsequent summary and detailed description, and the appended claims, taken in conjunction with the accompanying drawings and this background.

BRIEF SUMMARY

In one exemplary embodiment, a QD detector film is densified by electrolysis, high vacuum treatment, or high g-force centrifuging. A second exemplary embodiment includes the use of a photocathode and or anode modified to extend the path length of a photon through a detector structure, a so-called "photon trap". A third exemplary embodiment defines a PN detector or APD based on QDs and their unique properties. A ladar system includes a light source configured to generate light. The light may be directed and diffused into the field of view in a single pulse, a "flash LADAR". A scanning mechanism may also be introduced to selectively direct the light into a portion of the field of view, and multiple pulses transmitted to capture the 3D image, "Scanning LADAR". The ladar system also includes a receive lens assembly for receiving light reflected off an object in the field of view. A plurality of PN, PIN, or avalanche photodiodes are arranged in an array. Each photodiode is configured to receive light from the receive lens assembly. The ladar system further includes a bias circuit electrically connected to each photodiode and adapted to provide an optimum bias voltage for the array. The avalanche photodiode may be operated at an optimum bias condition to provide greater analog signal to noise ratio over a PN photodiode, or it may be biased at a higher level, and operated as a single photon (SPAD) digital detector. A reduction in system complexity, size, and cost is thereby provided for any of the cited detector structures by the instant invention.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a ladar system 100 is shown and described herein.

The term "ladar" or "LADAR", as used herein, refers to a sensing technology which uses laser light to provide an image of a scene as well as ranging (i.e., distance) data to objects in the scene. Equivalent terms for "ladar" include, but are not limited to, lidar, LIDAR, LiDAR, laser detection and ranging, light detection and ranging, and laser imaging and ranging.

Figure 1:
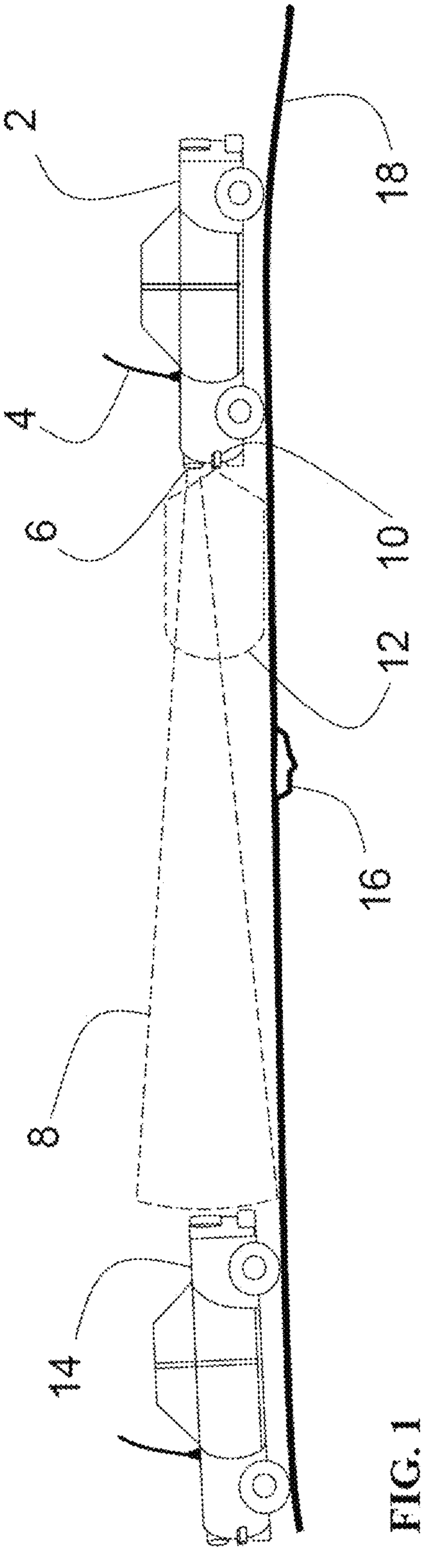
FIG. 1 is a sideview of a typical use scenario involving two vehicles and a roadway.

FIG. 1 is a sideview of a typical use scenario illustrating the requirement for both longer range narrow field of view ("FOV"), and a shorter range wider FOV. A first vehicle 2, with a dual FOV sensor mounted at the front of the vehicle 2, images both the roadway 18 and a second vehicle 14. A narrow FOV sensor 6 is shown embedded in a headlight assembly (not separately numbered) with a vertical field of view 8. A wider FOV sensor 10 which has a shorter range and vertical field of view 12 is located nearby in an auxiliary lamp assembly. One purpose of the wider vertical FOV is to detect obstacles in the roadway 18 or subterranean roadway defects 16, e.g., potholes. A radio antenna 4 is shown, which may be utilized as part of the surround view and traffic awareness systems which enable autonomous driving.

Figure 2:
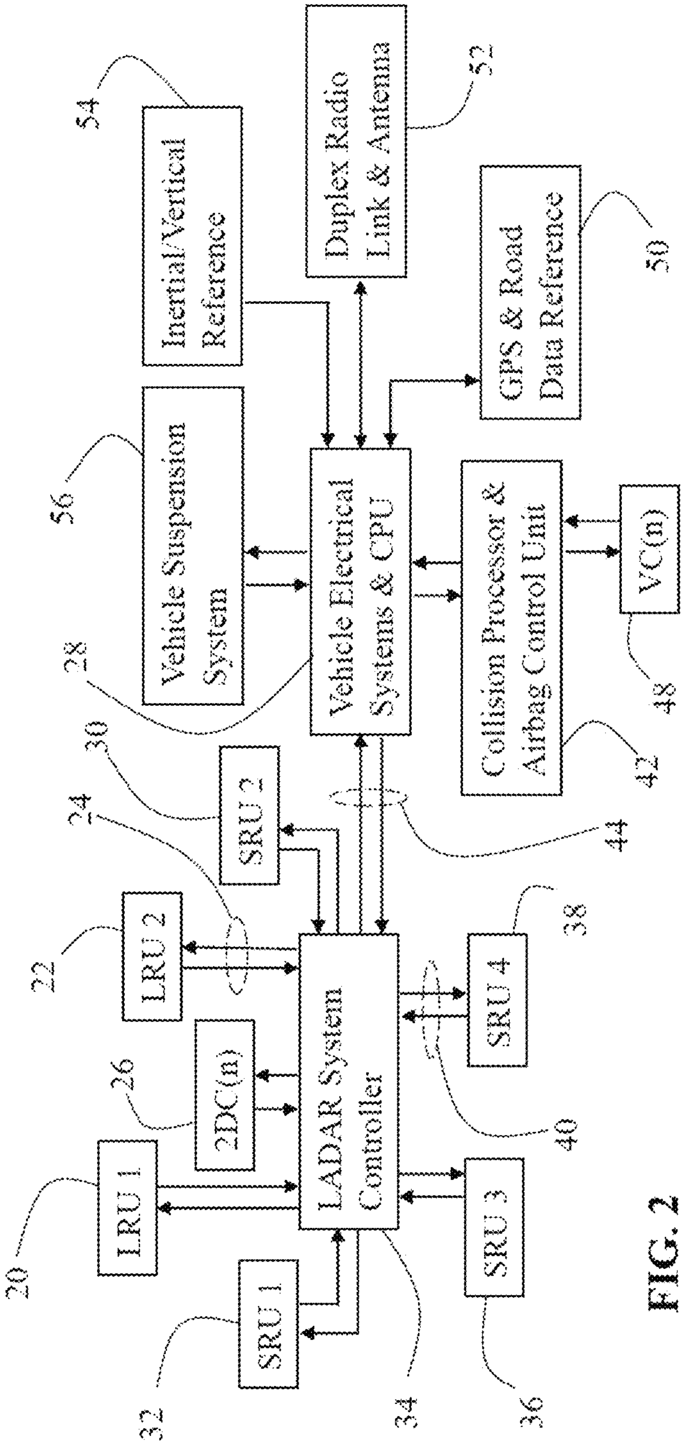
FIG. 2 is block diagram representation of a ladar subsystem and supporting vehicle systems according to an exemplary embodiment.

FIG. 2 is a block diagram of an exemplary embodiment of the optimized ladar sensor in a typical vehicle installation. A ladar system controller 34 communicates with all six of the ladar sensors mounted on the vehicle. In a typical installation, two long range units, (LRU 1) 20 and (LRU 2) 22 connect to ladar system controller 34 through a set of bidirectional electrical connections 24. The electrical connections 24 may also have an optical waveguide and optical transmitters and receivers to transfer data, control, and status signals bidirectionally between long range ladar sensors 20 and 22 to ladar system controller 34. Ladar system controller 34 also communicates with the 4 short range units, (SRU 1) 32, (SRU 2) 30, (SRU 3) 36, and (SRU 4) 38, each through a set of bidirectional electrical connections 40. The electrical connections 40 may also have an optical waveguide and optical transmitters and receivers to transfer data, control, and status signals bidirectionally from short range ladar sensors 32, 30, 36, and 38, to ladar system controller 34. Each of the ladar system sensors may include data processors to reduce the processing load on the central processor; for example, developing the point cloud and isolating/segmenting objects in the field of view and object speed from the point cloud. A number (n) of conventional 2D still or video cameras 26 also connect to ladar system controller 34, and are designed to overlap the fields of view of the ladar sensors installed on the vehicle 2. Bidirectional electrical connections 44 serve to transfer 3D data maps, status, and control signals between ladar system controller 34 and the vehicle electrical systems and central processing unit (CPU) 28. At the core of the vehicle, an electronic brain may control all functioning of the vehicle 2, and typically controls all other subsystems and co-processors. The electronic brain, or central processing unit (CPU) 28 is here grouped together with the basic electrical systems of the vehicle, including battery, headlights, wiring harness, etc. The vehicle suspension system 56 receives control commands and returns status through bidirectional electrical connections, and is capable of modifying the ride height, spring rate, and damping rate of each of the four wheels independently. An inertial reference 54 also has a vertical reference, or gravity sensor as an input to the CPU 28. A global positioning reference 50 may also be connected to the vehicle CPU 28. The GPS reference unit 50 may also have a database of all available roads and conditions in the area which may be updated periodically through a wireless link. A duplex radio link 52 may also be connected to CPU 28, and communicate with other vehicles 14 in close range and which may be involved in a future impact, and may also receive road data, weather conditions, and other information important to the operations of the vehicle 2 from a central road conditions database. The vehicle 2 may also provide updates to the central road conditions database via radio uplink 52, allowing the central road conditions database to be augmented by any and all vehicles 2 which are equipped with ladar sensors and a radio link 52. A collision processor and airbag control unit 42 connects bidirectionally to CPU 28 as well, receiving inputs from a number of accelerometers, brake sensors, wheel rotational sensors, ladar sensors, etc. and makes decisions on the timing and deployment of both internal and external airbags. ACU 42 also controls the venting of airbags through bidirectional electrical connections to a number of vent controls situated in the airbag units on the vehicle 2. Vehicle 2 is often equipped with a dedicated surround view video system comprised of a number of video cameras 48 which also communicate bidirectionally with CPU 28.

Figure 3:
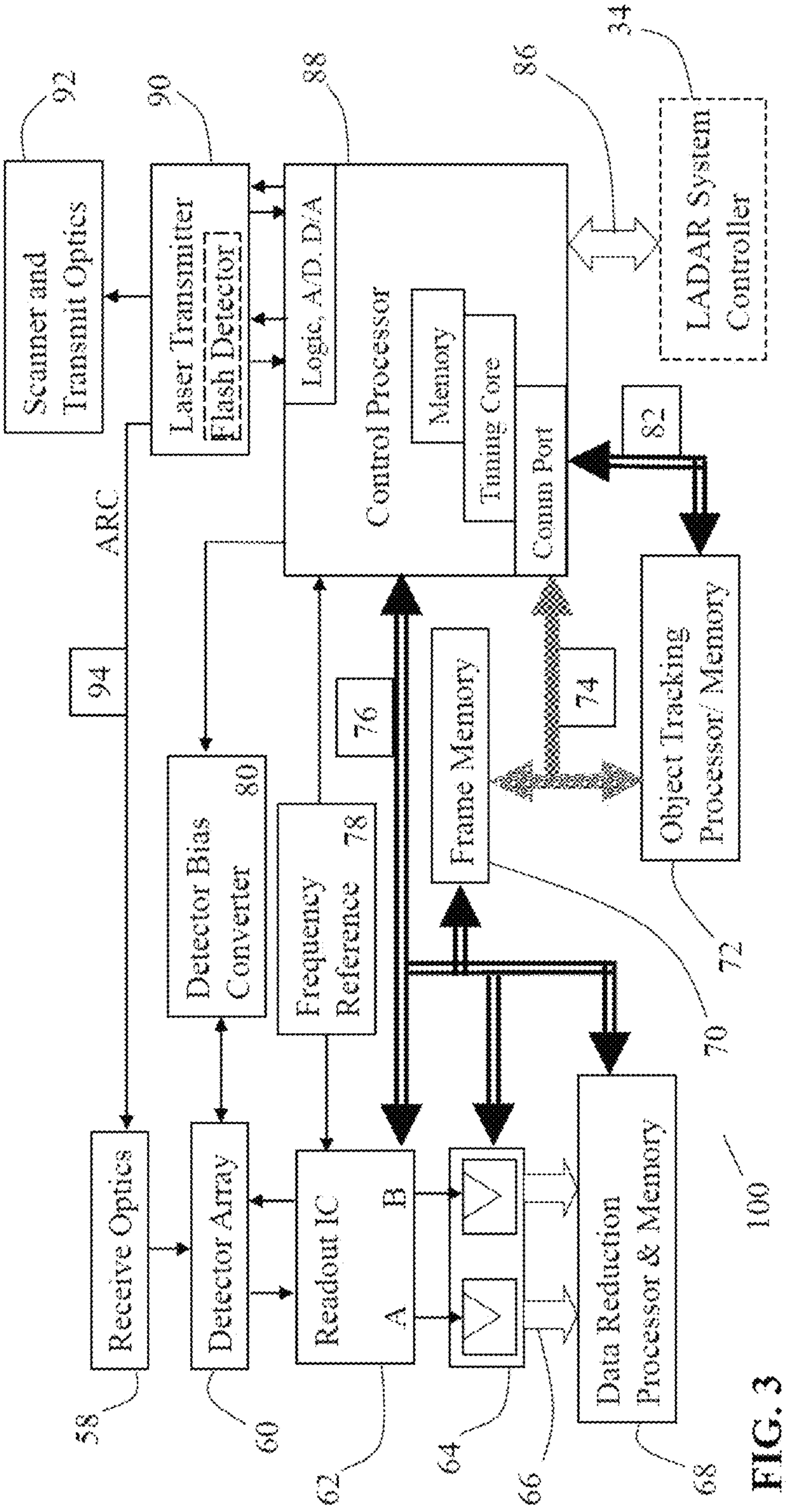
FIG. 3 is a functional block diagram of a LADAR sensor according to an exemplary embodiment.

FIG. 3 is a block diagram of a ladar sensor which describes both long range ladar sensors 6 and short range sensors 10 typical of a preferred embodiment. The ladar sensor may be a flash type or a scanning type. Both types are direct time of flight ladar systems (DTOF), so a great deal of commonality is natural. Laser transmit pulses are short (2-3) ns) and powerful. In the flash type ladar sensor, the scanner is eliminated from functional block 92, and the laser transmit power is increased. The flash sensor is typically used over shorter ranges and in high vibration and mechanical shock applications. The scanning type ladar sensor uses less transmit power, and has the ability to direct the transmit beam anywhere in the field of view. This architecture yields an advantage for long range use, at the expense of complexity. Adaptations of the pulsed laser transmitter 90, scanner and transmit optics 92, receive optics 58, and in some cases, programmable changes to the sampling circuitry of readout integrated circuit 62 may be effected to provide range enhancement, wider or narrower field of view, and reduced size and cost. A first embodiment provides a 256×64 detector array 60 of light detecting elements situated on a common substrate which is stacked atop a readout integrated circuit 62 using a hybrid assembly method. In other embodiments of the design, M×N focal plane arrays of light detecting elements with M and N having values from 2 to 1024 and greater are anticipated. The instant invention makes use of quantum dot detector technology to fabricate the detector array 60 directly atop the ROIC 62. This eliminates a costly part and an assembly operation. The functional elements depicted in FIG. 3 may first be described with respect to the elements of a typical long range ladar sensor 6. A control processor 88 controls the functions of the major components of the ladar sensor 6. Control processor 88 has logic, analog to digital (A/D) and digital to analog (D/A) converters, and connects to pulsed laser transmitter 90 through bidirectional electrical connections. The bidirectional connections transfer commands from control processor 88 to pulsed laser transmitter 90 and return monitoring signals from pulsed laser transmitter 90 to controller 88. A light sensitive diode detector (Flash Detector) is placed at the back facet of the laser so as to intercept a portion of the laser light pulse produced by pulsed laser transmitter 90. An optical sample of the outbound laser pulse taken from the front facet of pulsed laser transmitter 90 may be routed to a section of detector array 60 as an automatic range correction (ARC) signal, typically through a fiber optic waveguide. The pulsed laser transmitter 90 may be an erbium doped fiber amplifier output with a master oscillator semiconductor laser operating near 1550 nm. This MOPA arrangement is a flexible and powerful way to enable a high performance scanning ladar sensor. Pulsed laser transmitter 90 may also be a diode pumped solid-state (DPSS) laser typically used by a flash ladar. It may also be a monoblock laser, semiconductor laser, fiber laser, or an array of semiconductor lasers. It may also employ more than one individual laser to increase the data rate. In a first preferred embodiment, pulsed laser transmitter 90 is an EDFA output with master oscillator at or near 1550 nm. In a second preferred embodiment, pulsed laser transmitter 90 is a Nd:YAG (1064 nm) or erbium glass (1540 nm) DPSS laser.

In operation, the control processor 88 initiates a laser illuminating pulse by sending a logic command or modulation signal to pulsed laser transmitter 90, which responds by transmitting an intense pulse of laser light through scanner and transmit optics 92. A scanning mirror may direct the light to a particular location in the FOV. In the case of an EDFA/MOPA, the signal sent to laser transmitter 90 is an electrical pulse supplied to a semiconductor laser diode operating at or near 1550 nm. In the case of a solid state laser based on erbium glass, neodymium-YAG, or other solid-state gain medium, a simple bi-level logic command may start a number of pump laser diodes emitting into a gain medium for a period of time which will eventually result in a single flash of the pulsed laser transmitter 90. In the case of a semiconductor laser, the device is electronically pumped, and may be modulated instantaneously by modulation of the current signal injected into the laser diode. In this case, a modulation signal of a more general nature is possible, and may be used with beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in on-chip memory within control processor 88 as a lookup table of digital memory words representative of analog values. The lookup table is read out in sequence by control processor 88 and converted to analog values by an onboard digital-to-analog (D/A) converter, and passed to the pulsed laser transmitter 90 driver circuit. The combination of a lookup table stored in memory and a D/A converter, along with the necessary logic circuits, clocks, and timers resident on control processor 88, together comprise an arbitrary waveform generator (AWG) circuit block. The AWG circuit block may alternatively be embedded within a laser driver as a part of pulsed laser transmitter 90. Scanner and transmit optics 92 direct the high intensity spot produced by pulsed laser transmitter 90 to a selected zone in the field of view to be imaged by the long range ladar sensor 6. An optical sample of the transmitted laser pulse (termed an ARC signal 94) may be sent to the detector array 60 via optical waveguide. A few pixels in a section of detector array 62 may be illuminated with the ARC (Automatic Range Correction) signal 94, which establishes a zero time reference for the timing circuits in the readout integrated circuit (ROIC) 62. Alternatively, the zero time reference may be established by the flash detector output from the laser or master oscillator back facet fed back to the control processor 88. The ARC signal 94 may also be routed to a second flash detector within pulsed laser transmitter 90 to establish a time zero reference for control processor 88. Each unit cell of the readout integrated circuit 62 has an associated timing circuit which is started by an electrical pulse derived from one of these ARC signal implementations.

Pulsed laser light reflected from a feature in the scene in the field of view of receive optics 58 is collected and focused onto an individual detector element of the detector array 60. This reflected laser light optical signal is then detected by the affected detector element and converted into an electrical current pulse which is then amplified by an associated unit cell electrical circuit of the readout integrated circuit 62, and the time of flight measured. Thus, the range to each reflective feature in the scene in the field of view is measurable by the long range ladar sensor 6. The instant invention makes use of a detector array formed by layers of P-type and N-type quantum dots which are deposited on a silicon readout IC (ROIC). The invention allows for a much lower cost LADAR to be manufactured, while maintaining the high performance required for automotive LADAR applications. The detector array 60 and readout integrated circuit 62 may be an M×N or N×N sized array. Scanner and transmit optics 92 consisting of a spherical lens, cylindrical lens, holographic diffuser, diffractive grating array, or microlens array, condition the output beam of the pulsed laser transmitter 90 into a proper conical, elliptical, or rectangular shaped beam for illuminating a selected section of a scene or objects in the path of vehicle 2, as illustrated in FIG. 1.

Continuing with FIG. 3, receive optics 58 may be a convex lens, spherical lens, cylindrical lens or diffractive grating array. Receive optics 58 collect the light reflected from the scene and focus the collected light on the detector array 60. In a preferred embodiment, detector array 60 is formed in a thin film of gallium arsenide deposited epitaxially atop an indium phosphide semiconducting substrate. Typically, detector array 60 would have a common cathode contact where a highly doped N+ InP substrate is exposed to the light. Each detector element 170 of detector array 60 would have an electrical connection to the common cathode formed by the substrate of detector array 60 in a typical arrangement. The detector elements 170 each have an anode contact electrically connected to the supporting readout integrated circuit 62. These isolated anode contacts are typically connected through a number of indium bumps deposited on the detector array 60. The cathode contacts of the individual detectors of detector array 60 would then be connected to a high voltage detector bias grid on the illuminated side of the array. Each anode contact of the detector elements of detector array 60 is thus independently connected to an input of a unit cell electronic circuit of readout integrated circuit 62. The described arrangement may be termed an N on P, and is generally preferred. The elements may be reversed, and a P on N may be effected with little or no loss of utility, to accommodate certain types of detector technologies such as Ge:Si (germanium on silicon) for example. This traditional hybrid assembly of detector array 60 and readout integrated circuit 62 may still be used, but quantum dot detector technology may provide equivalent performance at reduced cost for detector array 60.

Readout integrated circuit 62 comprises a rectangular array of unit cell electrical circuits, each unit cell with the capability of amplifying a low level photocurrent received from an optoelectronic detector element of detector array 60, sampling the amplifier output, and detecting the presence of an electrical pulse in the unit cell amplifier output associated with a light pulse reflected from the scene and intercepted by a detector element 170 of detector array 60 which connects to the unit cell electrical input. In a first preferred embodiment detector array 60 may be an array of PN photodiodes. In a second preferred embodiment detector array 60 may be an array of avalanche photodiodes, capable of photoelectron amplification, and modulated by an incident light signal at the design wavelength. In a third preferred embodiment, the detector array 60 elements may be a P-intrinsic-N design or N-intrinsic-P design with the dominant carrier being holes or electrons respectively; in which case the corresponding ROIC 62 would have the polarity of the bias voltages and amplifier inputs adjusted accordingly. The hybrid assembly of detector array 60 and readout integrated circuit 62 of the preferred embodiment is then mounted to a supporting circuit assembly, typically on a FR-4 substrate or ceramic substrate (not shown). The circuit assembly provides support circuitry which supplies conditioned power, a reference clock signal, calibration constants, and selection inputs for the readout column and row, among other support functions, while receiving and registering range and intensity outputs from the readout integrated circuit 62 for the individual elements of the detector array 60, as shown here in FIG. 3. Many of these support functions may be implemented in FPGA or control processors which reside on the same circuit assembly.

A detector bias converter circuit 80 applies a time varying and in some cases, individualized detector bias to the elements of detector array 60. The bias converter 80 provides optimum detector bias levels to reduce the hazards of saturation in the near field of view of detector array 60, while maximizing the potential for detection of distant objects in the field of view of detector array 60. The contour of the time varying detector bias supplied by detector bias converter 80 is formulated by control processor 88 based on inputs from the data reduction processor 68, indicating the reflectivity and distance of objects or points in the scene in the field of view of the detector array 60. Control processor 88 also provides several clock and timing signals from a timing core to readout integrated circuit 62, data reduction processor 68, analog-to-digital converters 64, object tracking processor 72, and their associated memories. Control processor 88 relies on a temperature stabilized frequency reference 78 to generate a variety of clocks and timing signals. Temperature stabilized frequency reference 78 may be a temperature compensated crystal oscillator (TCXO), dielectric resonator oscillator (DRO), or surface acoustic wave device (SAW). The timing core resident on control processor 88 may include a high frequency tunable oscillator, programmable prescaler dividers, phase comparators, and error amplifiers.

Continuing with FIG. 3, control processor 88, data reduction processor 68, and object tracking processor 72 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 70 serves to hold a number of frames, each frame being the image resulting from a single laser pulse in the case of a flash ladar. The notion of a frame is somewhat more flexible for a scanning type ladar, as it may include the entire FOV, or only a selected region of interest with higher than usual resolution. Both data reduction processor 68 and object tracking processor 72 may perform 3D image processing, to reduce the load on a central processing unit often associated with ladar system controller 34.

In a preferred embodiment, the frame memory 70 may be large enough to hold 50 frames, a frame being a complete image of the scene data. The ROIC 62 "A" and "B" outputs are analog outputs, and the analog samples presented there are converted to digital values by a dual channel analog-to-digital (A/D) converter 64. The digital outputs 66 of the A/D converters 64 connect to the inputs of the data reduction processor 68. A/D converters 64 may also be integrated into readout integrated circuit 62. The digital outputs 66 are typically 10 or 12 bit digital representations of the uncorrected analog samples measured at each pixel of the readout IC 62, but other representations with greater or fewer bits may be used, depending on the application. The rate of the digital outputs 66 depends upon the frame rate and number of pixels in the array. The data reduction processor 68 refines the nominal range measurements received from each pixel by curve fitting of the analog samples to the shape of the outgoing laser illuminating pulse, which is preserved by the reference ARC pulse signal. In one acquisition mode, the frame memory 70 may be used to hold a single "point cloud" image for each sequence of illuminating laser pulses. The term "point cloud" refers to an image created by the range and intensity of the reflected light pulse as detected by each pixel of the 256×64 array of the present design. The data reduction processor serves mainly to refine the range and intensity (R&I) measurements made by each pixel prior to passing the R&I data to the frame memory 70 over data bus 76. In this mode, no raw data or analog samples are retained in memory independently of the R&I "point cloud" data. Frame memory 70 provides individual or multiple frames, or full point cloud images, to control processor 88 over data bus 76, and to an optional object tracking processor 72 over data bus 76 as required. Alternatively, when object tracking processor 72 is located remotely, a secondary bus connection 82 may be used to connect object tracking processor 72 to the point cloud data in frame memory 70 via the communications port embedded in control processor 88.

As shown in FIG. 3, data reduction processor 68 and control processor 88 may be of the same type, a reduced instruction set (RISC) digital processor with hardware encoded integer and floating point arithmetic units. Object tracking processor 72 may also be of the same type as RISC processors 68 and 88, but may in some cases be a processor with greater capability, suitable for highly complex graphical processing. Object tracking processor 72 may have in addition to hardware encoded integer and floating point arithmetic units, a number of hardware encoded matrix arithmetic functions, including but not limited to; matrix determinant, matrix multiplication, and matrix inversion. In operation, the control processor 88 controls readout integrated circuit 62, A/D converters 64, data reduction processor 68 and object tracking processor 72 through a bidirectional control bus 76 which allows for the master, control processor 88 to pass commands on a priority basis to the dependent peripheral functions. Bidirectional control bus 76 also serves to return status and process parameter data to control processor 88 from readout IC 62, A/D converters 64, data reduction processor 68, and object tracking processor 72. Data reduction processor 68 refines the nominal range data and adjusts each pixel intensity data developed from the digitized analog samples received from A/D converters 64, and outputs a full image frame via data and control bus 76 to frame memory 70, which is a dual port memory having the capacity of holding several frames to several thousands of frames, depending on the application. Object tracking processor 72 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 72 may share a dedicated high speed data bus 74 to a communications port on control processor 88. Any raw data, adjusted range and intensity data, control, and communications then pass between a communications port on control processor 88 and a centralized ladar system controller 34 through bidirectional connections 86.

Power and ground connections (not shown) may be supplied through an electromechanical interface. Bidirectional connections 86 may be electrical or optical transmission lines, and the electromechanical interface may be a DB-25 electrical connector, or a hybrid optical and electrical connector, or a special automotive connector configured to carry signals bidirectionally for the long range ladar sensor 6 as well as electrical connections for a headlamp assembly which may have the long range ladar sensor 6 embedded therein. Bidirectional connections 86 may be high speed serial connections such as Ethernet, USB or Fibre Channel, or may also be parallel high speed connections such as Infiniband, etc., or may be a combination of high speed serial and parallel connections, without limitation to those listed here. Bidirectional connections 86 also serve to upload information to control processor 88, including program updates for data reduction processor 68, object tracking processor 72, and global position reference data, as well as application specific control parameters for all of the long range ladar sensor 6 functional blocks. Inertial and vertical reference 54 also provides data to the long range ladar sensor 6 from the host vehicle 2 through the vehicle electrical systems and CPU 28, bidirectional electrical connections 44, and the ladar system controller 34 as needed. Likewise, any other data from the host vehicle 2 which may be useful to the long range ladar sensor 6 may be provided in the same manner as the inertial and vertical reference data. Inertial and vertical reference data may be utilized in addition to external position references by control processor 88, which may pass position and inertial reference data to data reduction processor 68 for adjustment of range and intensity data, and to object tracking processor 72 for utilization in multi-frame data synthesis processes. The vertical reference commonly provides for measurement of pitch and roll, and is adapted to readout an elevation angle, and a twist angle (analogous to roll) with respect to a horizontal plane surface normal to the force of gravity. The long range ladar sensor 6 in a preferred embodiment has an EDFA/MOPA transmitter assembly, but may employ a q-switched solid state laser. Such a laser produces a single output pulse with a Gaussian profile if properly controlled. The pulse shape of a DPSS laser of this type is not easily modulated, and therefore must be dealt with "as is" by the long range ladar sensor 6 receiver section.

The operations of a short range ladar sensor 10 of the type which may be housed separately in an auxiliary lamp assembly such as a taillight, turn signal, or parking light are the same as the operations of the long range ladar sensor 6 described above with some exceptions. A flash type ladar may be selected for this short range ladar 10 application. The short range ladar sensor 10 may also be a scanning type adapted for short range. The scanning type short range ladar sensor 10 may use an unamplified semiconductor laser output which may be modulated in several ways. The long range ladar sensor 6 and short range ladar sensor 10 may differ only in the elimination of an EDFA, or the use of a lower gain EDFA for the short range sensor 10. Alternatively, a single high power edge emitting laser diode may be used for shorter range applications. In some cases, a vertical cavity surface emitting laser (VCSEL) may be used for short range applications. The preferred type of laser modulation may also be different, with a short range sensor 10 often using a plurality of laser pulses, or an extended modulation sequence to determine range. The transmit optics 92 and receive optics 58 may also differ, owing to the different fields of view for a long range ladar sensor 6 and a short range ladar sensor 10. Differences in the transmitted laser pulse modulation between the long range ladar sensor 6 and short range ladar sensor 10 may be accommodated by the flexible nature of the readout IC 62 sampling modes, and the data reduction processor 68 programmability. The host vehicle 2 may have a number of connector receptacles generally available for receiving mating connector plugs from USB, Ethernet, RJ-45, or other interface connection, and which may alternatively be used to attach long range ladar sensors 6 or short range ladar sensors 10 of the type described herein.

Figure 4:
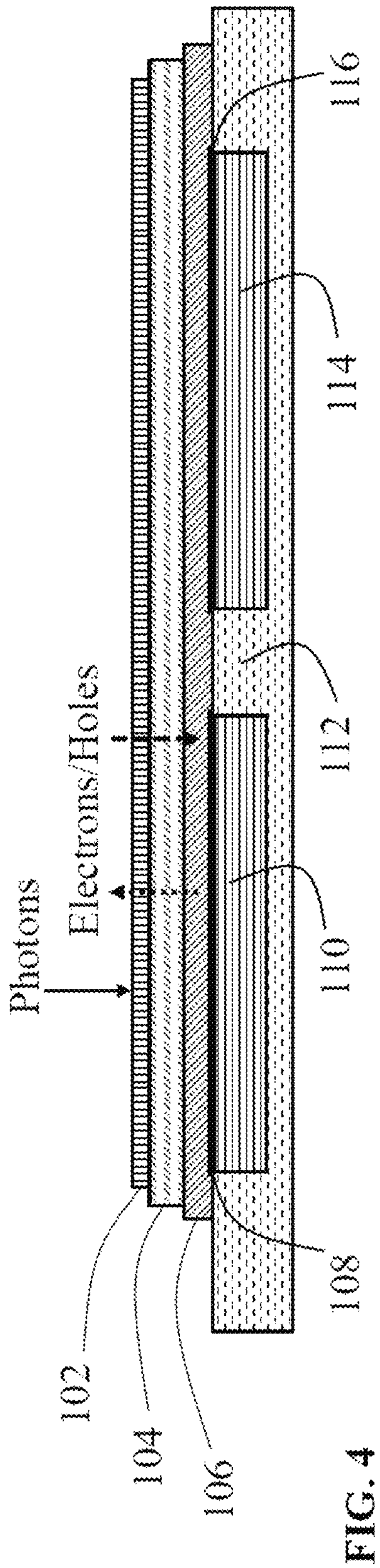
FIG. 4 is a cross section of a quantum dot PN detector formed atop a pixel circuit of a readout IC.

FIG. 4 is a cross section of a typical quantum dot P-N detector element. This arrangement is commonly used in integrating imagers, such as video cameras, where the integration time may be 10 ms or greater. Pulse response for these imagers is not normally a priority. They have a great potential for low cost detector arrays, tunable to the wavelength of the QD. The deficiencies for ladar applications are in the low quantum efficiency and high capacitance. The instant invention addresses both of these shortcomings. A transparent conductive layer 102 allows for the passage of incident photons and the collection of electrons, forming a cathode common to all pixels in the array. Transparent conductive layer 102 may be indium tin oxide (ITO), or other suitable compound. An N type quantum dot film 104 is applied atop P type QD film 106, forming a PN junction. The anode contact 108 of the PN diode rests atop circuit 1 110 of the quad pixel array. The anode contact 108 rests on an insulating dielectric, and is connected to circuit 1 110 through conductive vias formed photolithographically. Silicon substrate 112 may be either P type or N type, depending on circuit design considerations. Circuit 2 114 of the quad pixel array is shown connecting to anode contact 116 of a second QD detector diode.

Figure 5:
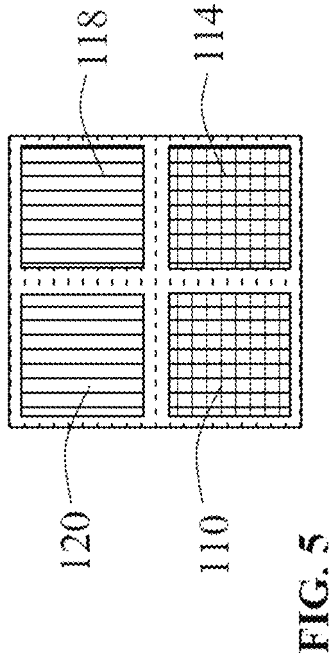
FIG. 5 is a plan view of a ROIC showing a quad pixel circuit arrangement before the PN detector is fabricated thereon.
Figure 6:
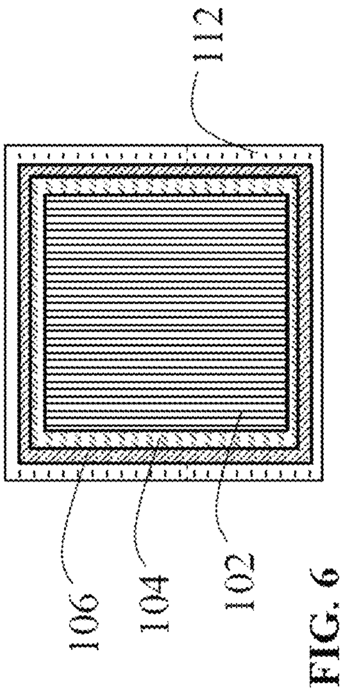
FIG. 6 is a plan view showing the quad pixel and fabricated PN photodetector structure.

FIG. 5 is a plan view of the quad detector array of FIG. 4. Circuit 3 118 and circuit 4 120 are shown here before the QD film layers are applied. FIG. 6 is a plan view of the completed quad detector array, including substrate 112, P type QD film 106, N type QD film 104, and transparent conductive film 102. In a typical process, N-type or P-type QDs are suspended in a solvent such as toluene or benzene and spin coated onto a ROIC wafer. The solution may also contain compounds which act as ligands when the solvent is ultimately evaporated. Ligands of oleic acids are used in some cases, which impart some mechanical stability and an improvement in mobility in the quasi-solid film. As noted, the QD films presently in use suffer from low quantum efficiency and high capacitance. Electron transport properties are less than desirable. This may be expressed as a low mobility in a solid ($\mu_e$ and $\mu_h$) or quasi-solid. The low mobility increases the time it takes to transit the device for an electron/hole, and the pair decays before reaching the cathode/anode. An electron/hole pair is excited by the elastic collision of a photon with a QD site. To accommodate the low mobility, the cathode and anode must be placed very close together, typically less than 1 micron, and in some cases as few as 100-300 nanometers. This arrangement alleviates the decay issue, but creates others. The narrow separation between cathode and anode results in high capacitance, and in the geometry of FIG. 2, also means thin layers of QDs, and therefore lower probability of a photon interacting successfully with a QD domain. Both of these qualities may stem from the same root cause, i.e. a lower density of states, and random irregularities in the dispersion of the QDs in the quasi-solid formed once the solvent is evaporated. The instant invention proposes to improve electron/hole mobility by increasing the density of the quasi-solid by several means.

Figure 7:
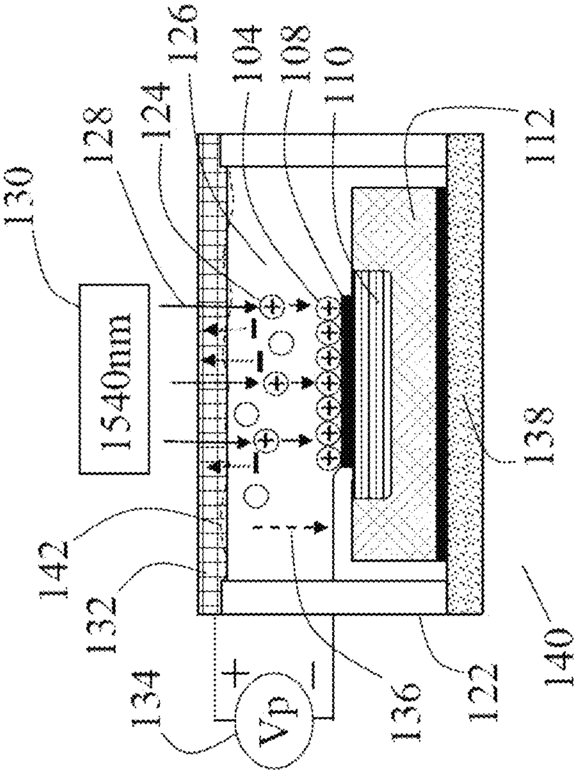
FIG. 7 is a cross section of a QD film densification method using an applied electric field.

FIG. 7 is a cross section view of the present design, showing a fabrication step alternative to spin coating of the QD solution onto substrate 112. The method and apparatus 140 is designed to increase the density of the QD film. Estimates of QD film densities in commercially available products range between 10-30%. A theoretical maximum would be around 74% with perfect packing density. Thus, the opportunity is clear for QD film densification to improve the performance of QD detectors. FIG. 3 shows the deposition of the quantum dots QDs 124 onto the anode contact 108 of a single pixel circuit 110 for reference. A chamber 140 is provided with a heating and cooling plate 138 and electrically and thermally insulating cylindrical walls 122. The QDs 124 are shown as circles. A"+" sign in the center represents an ionized QD. They are energized and polarized "–" by an external 1540 nm light source 130 in this example. Typically, the light source is a 1540 nm low intensity laser or LED. For 1064 detectors, or other wavelengths, the light source wavelength would be adjusted to match the desired detector wavelength. In the illustration the 1540 nm light 128 is absorbed by the QDs. An electron is energized by the absorbed photon, and then separated from the QD by the applied electric field 136. The electrons (–) drift towards the screen grid 132. The now positively charged QD nanoparticles drift under the influence of the electric field 136 onto the anode contact 108 as shown in the drawing. The electric field is imposed by voltage source 134 and screen grid 132, and must be strong enough to fully separate (ionize) the charged QD particle from the associated electron. The liquid surface level 142 should be in contact with the screen grid to allow electrons to be collect by voltage source $V_P$. The electrons (–) collected at the screen grid make the circuit through voltage source $V_P$, and recombine with the QD nanoparticles on the anode. Perhaps 1-15 layers of QDs are built up on anode 108 to form a P or N type QD film. Once the charge is neutralized, the QDs will appear as in the drawing of FIG. 8. without any (+) signs in the center. In this process, the applied 1540 nm light source and electric field work together to drive the positively charged QD particle onto the anode contact, creating a dense film 104. The applied electric field 136 is maintained as the solvent 126 evaporates, locking the QDs in place in a densified matrix.

Figure 8:
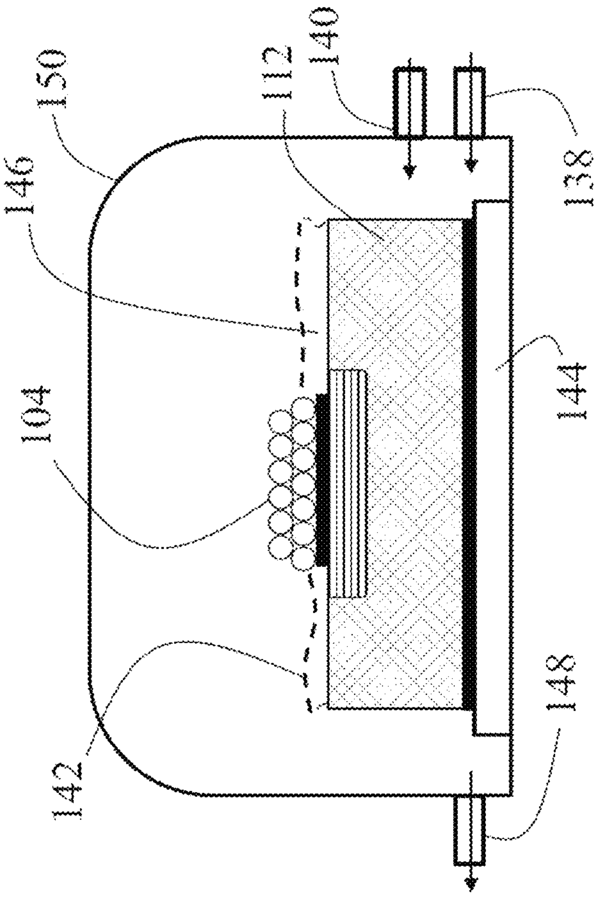
FIG. 8 is a cross section view of a QD film densification apparatus using partial vacuum and temperature control.

FIG. 8 shows a second method of QD film densification. Here the substrate 112 is loaded into a vacuum chamber 150 after spin coating of the QD suspension. An inert gas is injected via a first port 138 and solvent vapor injected through a second port 140. The substrate is cooled by a cooling and heating plate 144 enough to allow a thin layer of condensed solvent 146 to form and then be maintained as the vacuum chamber is slowly pumped down through an exit port 148. When the desired density is reached as determined by time, temperature, gas flow, and partial pressure, the cooling is removed slowly. As the solvent will then evaporate, the film solidifies in a densified state, aided by the lubrication of the disappearing solvent. Once the film solidifies, the vacuum is slowly released, creating positive pressure on the solidified film until atmospheric diffusion equalizes the pressure.

Figure 9:
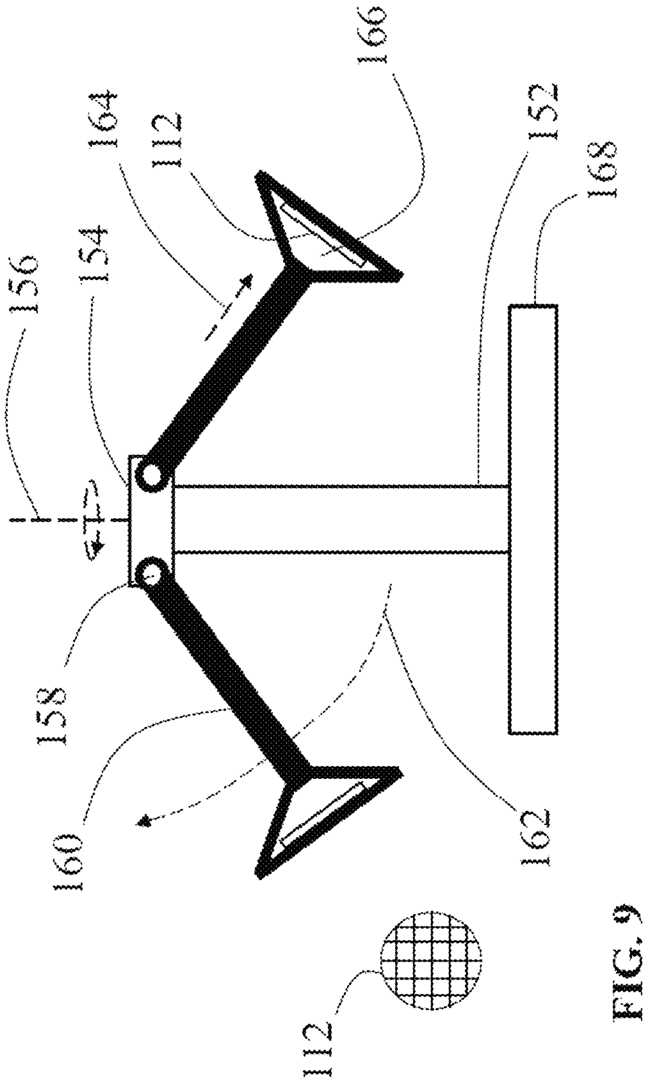
FIG. 9 is a diagram of a QD film densification apparatus adapted to apply a high force of acceleration.

FIG. 9 shows a third QD film densification apparatus and method. A large base 168 supports a column 152 which houses a rotary shaft (not shown). A hub 154 attached to the rotary shaft rotates around axis 156 when the process is initiated. After spin coating of a QD bearing suspension, substrate 112 is loaded horizontally into a chamber 166 at the end of force arm 160 when the apparatus is at rest. The force arm 160 will be in the vertical position. Once this step is complete, a rotary motor is engaged and the speed increased. This creates a force of acceleration 164 on the QD film (not shown), densifying the film. As the rotary speed is increased, the force arm and chamber 166 describe an arc 162 around pivot hinge 158 until the desired densification is reached as determined by time and angular velocity profile. This method is commonly referred to as centrifuging, and the apparatus a centrifuge.

A fourth method may be used to increase the density of QD films. Surface activation is a step common to many integrated circuit processes, and may be used here as the films are thin. Surface activation is a chemical process which typically involves loading a finished ROIC wafer into a vacuum chamber as depicted in FIG. 8. Ionized hydrogen (H+) is then introduced through a first port 140 under partial pressure, or in some process variants, together with an inert gas through a second port 138. The gases may be premixed and injected together through a single port. Depending on whether the layer to be deposited is N type QD or P type QD, the polarity of the etching gas may be reversed by using other inert gases such as argon or neon which are negatively ionized. Subsequently, the next QD layer is deposited by spin coating or other regular means.

Figure 10:
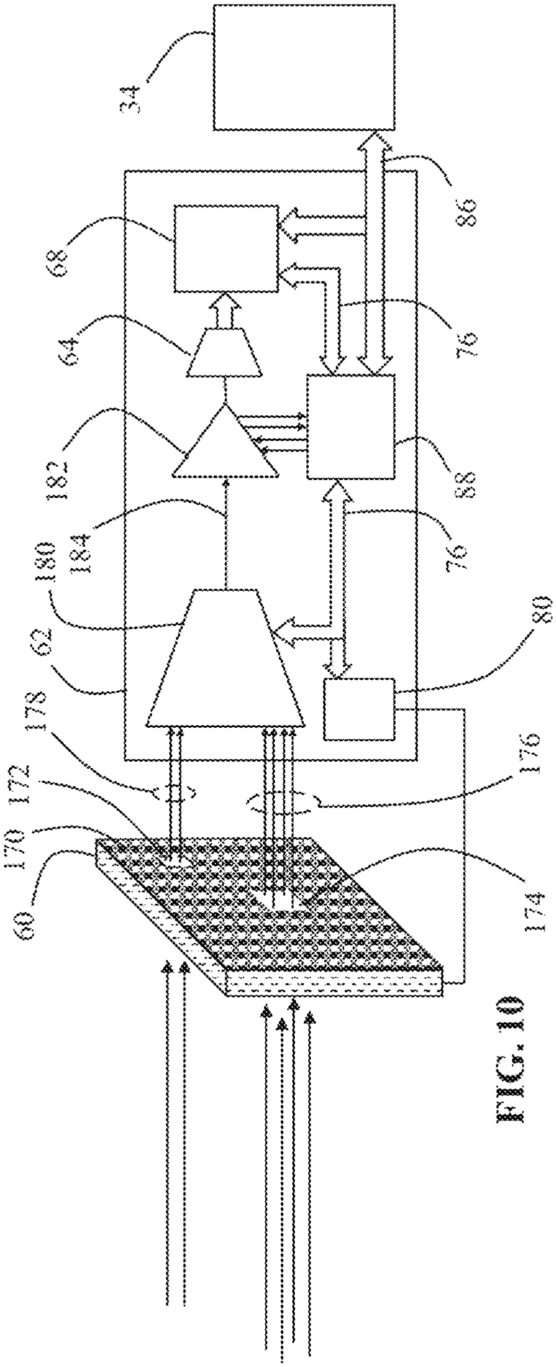
FIG. 10 is an electrical schematic diagram showing a receiver structure of a scanning LADAR according to one exemplary embodiment.

FIG. 10 is a block diagram of the instant invention showing the main elements of a receiver subsystem. The illustrated embodiment of the ladar system 100 includes an array 60 of photodiode elements 170. In one exemplary embodiment, each photodiode 170 is a PN photodiode. Photodiode 170 may also be a PIN, or an avalanche photodiode, and may be operated as a single-photon avalanche photodiode ("SPAD").

As stated above, the photodiodes 170 are arranged in an array 60. The photodiodes in an exemplary embodiment are arranged in rows and columns in a common plane termed a focal plane array. Each photodiode 170 is configured to receive light from the receive optics 58. Light reflected from the field of view will illuminate certain photodiodes 170 depending on the location of the object or objects in the field of view. In the illustrated embodiments the array 60 of photodiodes has a width less than 15 mm, but may be much larger. The instant invention eliminates an expensive InP substrate, which cannot exceed certain dimensional limits due to fragility and defect density. The improved QD detector thus enables a larger focal plane array, allowing for many more pixels.

In the exemplary embodiment shown in FIG. 10, the ladar system 100 includes a multiplexer 180. The multiplexer 180 receives signal inputs 176, 178 from selected groups of photodiodes 170 and delivers one or more of the signal inputs 176 or 178 to an output 184. The selection is effected by the readout integrated circuit 62 upon command from ladar system controller 34. The ladar system controller 34 may select any pixel groupings of greatest interest based on object and scene processor information. The pixel grouping 172 is shown here as a 1×2, and grouping 174 as a 2×2. The multiplexer 180 is responsive to a control signal from control bus 76, such that the control signal selects which of the signal inputs are delivered to the output 184. The output 184 connects to an amplifier 182 within a selected pixel. The output of amplifier 182 is selected and connected to an A/D converter 64 which may be integrated into control processor 88 in this compact version of the ROIC 62. A plurality of multiplexers 180 could be implemented instead of a single multiplexer, or a mesh structure used, as appreciated by those of ordinary skill in the art. A data reduction processor 68 is also shown integrated here into compact ROIC 62. Data reduction processor 68 is used to remove noise, refine range estimates, and correct for non-linearities in the data by means of mathematical or rules based algorithms.

Control processor 88 may be implemented partially as a logic block or state machine within each pixel, with global functions like A/D converter 64 resident on a common area of ROIC 62. The pixel control function may be realized by any of the cited structures, or by other circuitry as appreciated by those of ordinary skill in the art. The control processor 88 connects to the amplifier 182, and to supporting circuits within each pixel circuit of ROIC 62. The control processor 88 is also in communication with ladar system controller 34 via connections 86. Bias converter 80 provides an optimum voltage bias to the detector elements 170 of array 60.

The ladar system 100 may utilize a field-programmable gate array (FPGA) to implement the ladar system controller 34 functions and maintain communication with the control processor 88, and data reduction processor 68. An FPGA implementation may store data, provide instructions and/or signals to the pixel controllers, and/or perform other functions as appreciated by those of ordinary skill in the art. The multiplexer 180 is central to the functioning of a scanning ladar system, but may be omitted in the case of a flash ladar system.

Figure 11:
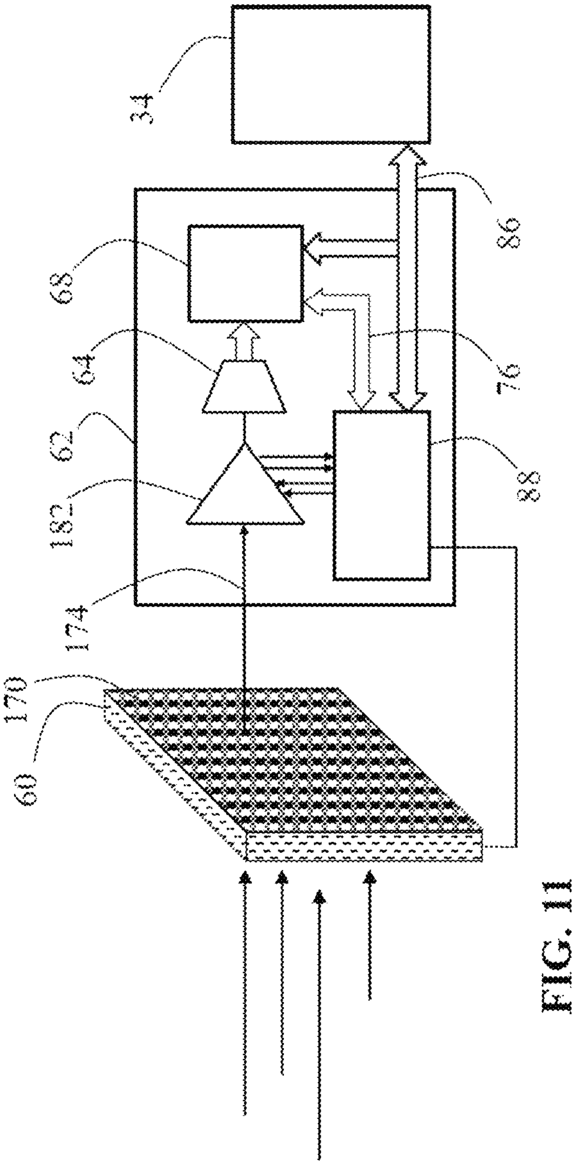
FIG. 11 is an electrical schematic diagram showing a receiver structure of a flash LADAR according to another exemplary embodiment.

FIG. 11 shows an implementation of the detector array 60 and ROIC 62 typical of a flash ladar system. The simpler arrangement allows for greater pixelation in the flash system, i.e. more pixels per unit area. This may be a desirable condition, as the scanner has resolution based on pointing accuracy of the illuminating laser, whereas the resolution of a flash system is based on the number and density of pixels. The operations of the pixel are as described with respect to FIG. 10, except the amplifier 182 has only one dedicated input, the signal 174 from a hard wired connection to a detector element 170 of array 60. In this ladar sensor embodiment, the detector bias converter 80 is integrated into the control processor 88 for reasons of simplicity and cost.

Figure 12:
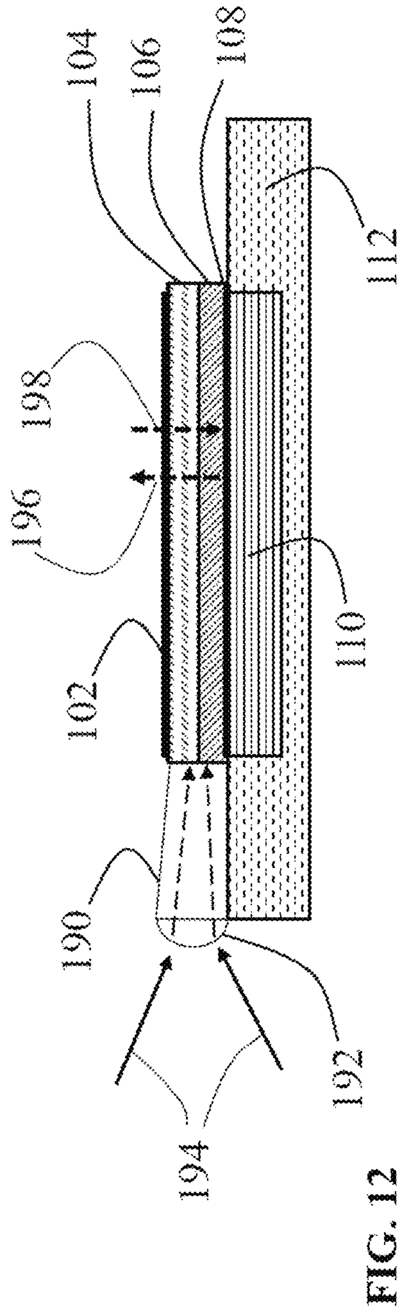
FIG. 12 is a cross section view of an edge coupled quantum dot detector illustrating an advantageous geometry.
Figure 13:
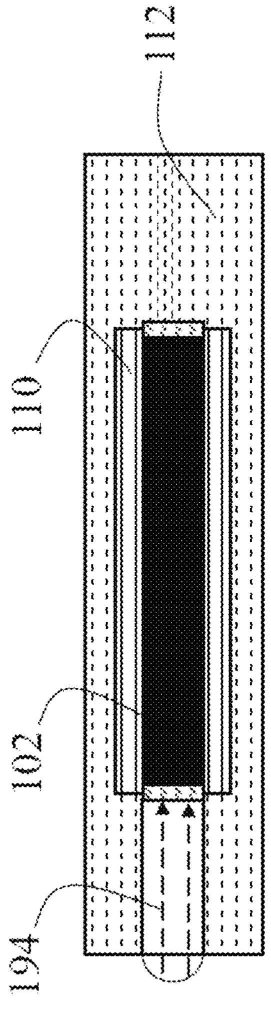
FIG. 13 is a plan view of the structure of FIG. 5.

FIG. 12 is a cross section side view of an edge-coupled detector. This geometry is a more favorable arrangement given the low quantum efficiencies of the QD films in use today. Photons 194 enter the lens 192 which collects and redirects them into waveguide 190, where they travel some distance before encountering the edge of P type QD film 106 and N type QD film 104. Electrons 196 collect at the cathode 102, and holes 198 travel to the anode 108 when the device is properly biased. Due to the lateral coupling of photons 194, there can be a much greater interaction length between photon and QD film. Waveguide 190 may be tapered vertically as shown to match the mode field height of the incident light to the height of the edge coupled QD detector. The photons in the QD films in use today may be described as having a mean free path greater than is desirable. The mean free path is the average distance a photon has to travel before colliding with a quantum dot in the quasi-solid film. The face coupled structure of FIG. 4 may be a 50×50 micron detector, having both a large surface area, and a short interaction length for photons entering the device. The overall height of this detector may only be a few hundred nanometers. Thus, the face coupled structure of FIG. 2 suffers from high capacitance due to the minimal overall height, and a short interaction path length for the photons entering the device. The geometry of the edge coupled device largely eliminates the quantum efficiency problem, as the interaction path length can be tens of microns as opposed to several hundred nanometers. Therefore, QEs approaching unity may be anticipated. Further, the surface area of the anode and cathode electrodes are greatly reduced. The edge coupled detector of FIG. 13 may have a cathode only 10×25 microns, for a 10:1 reduction in surface area and capacitance over the face coupled detector of FIG. 4. The edge coupled detector as shown in FIG. 5 may be useful as a fiber optic receiver component.

Figure 14:
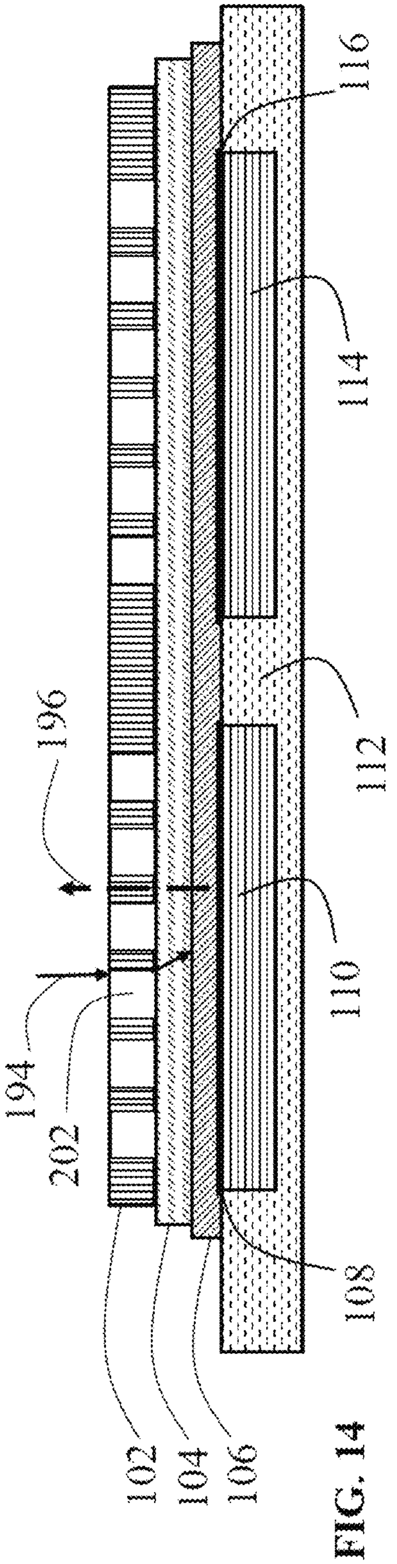
FIG. 14 shows a cross section of an improvement to the detector of FIG. 4.
Figure 15:
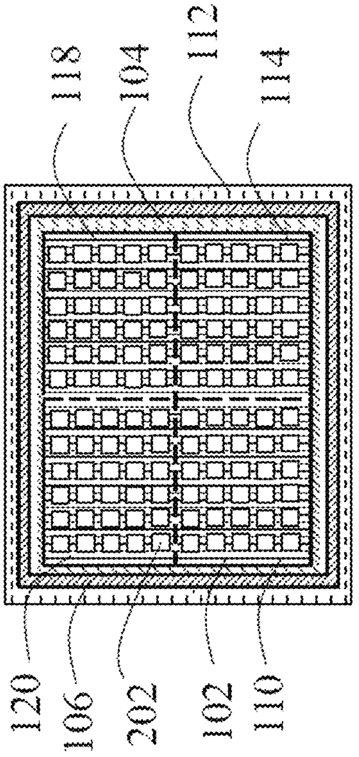
FIG. 15 is a plan view of a quad pixel detector array according to the cross-section view of FIG. 14.

FIGS. 14, 15 show an improved face coupled detector similar to FIG. 4, but with gaps 202 opened in the ITO cathode coating 102. The gaps 202 are opened in the ITO film 102, and create a rectangular mesh in 2D space, as can be seen in FIG. 15. The 6×5 array of white openings 202 in FIG. 15 show the proposed cathode structure in plan view. As can be seen in the diagram, photons 194 entering near the edge of the gap 202 will be refracted at the interface of ITO 102 and N type QD film 104. This refraction will increase the interaction length of the photon 194 with the N type film 104 and P type film 106, as the angle of travel is no longer perpendicular. While this small change may prove to be only a marginal improvement in quantum efficiency, it emphasizes the potential solution to low QE.

Figure 16:
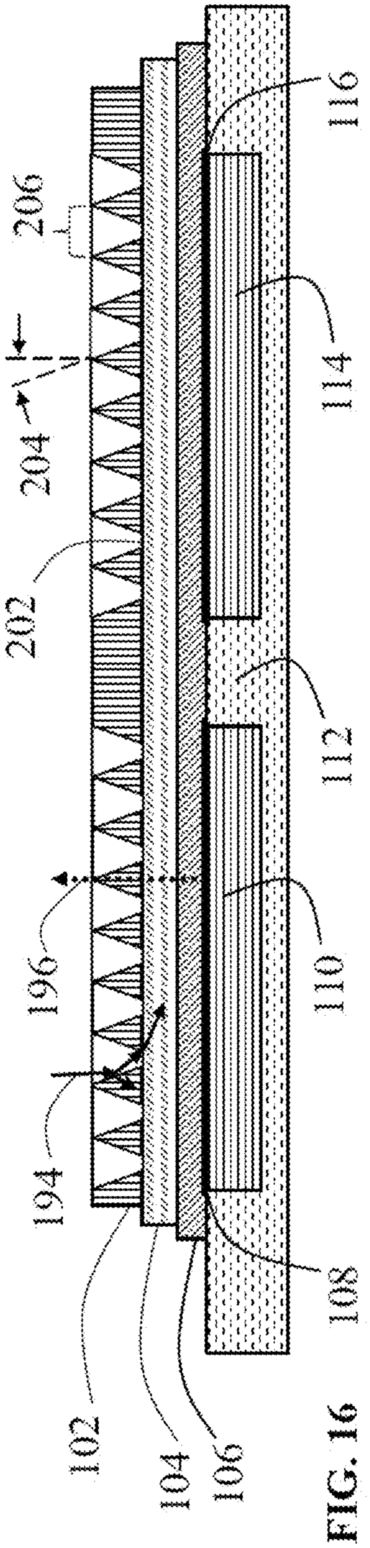
FIG. 16 is a cross section of another improvement to the detector of FIG. 4.
Figure 17:
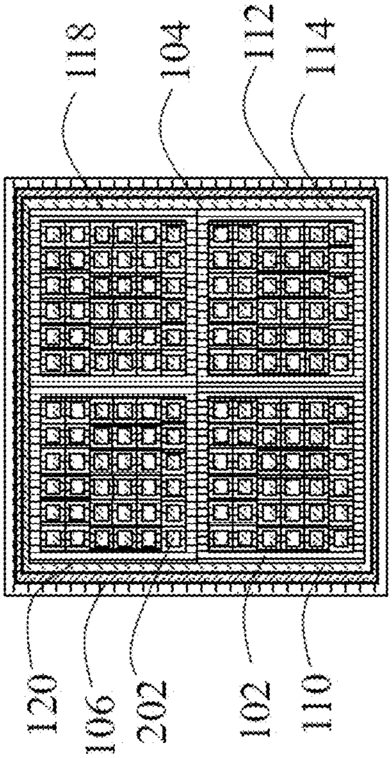
FIG. 17 is a plan view of a quad pixel detector array according to the cross-section view of FIG. 16.

FIGS. 16, 17 show an improvement to the structure proposed in FIG. 14. The gaps 202 are now bounded by wedge shaped sections of ITO 102, the wedges having an angle 204 and a pitch 206. As can be seen in the diagram, a greater number of photons 194 will be redirected laterally, both by partial reflection at the wedge surface, and by refraction at the interface with N type QD film 104. The gaps 202 are opened in the ITO film 102, and create a rectangular mesh in 2D space with a wedge profile, as can be seen in FIG. 17. In FIG. 17, the 6×5 array of white openings 202 show the proposed cathode structure in plan view.

Figure 18:
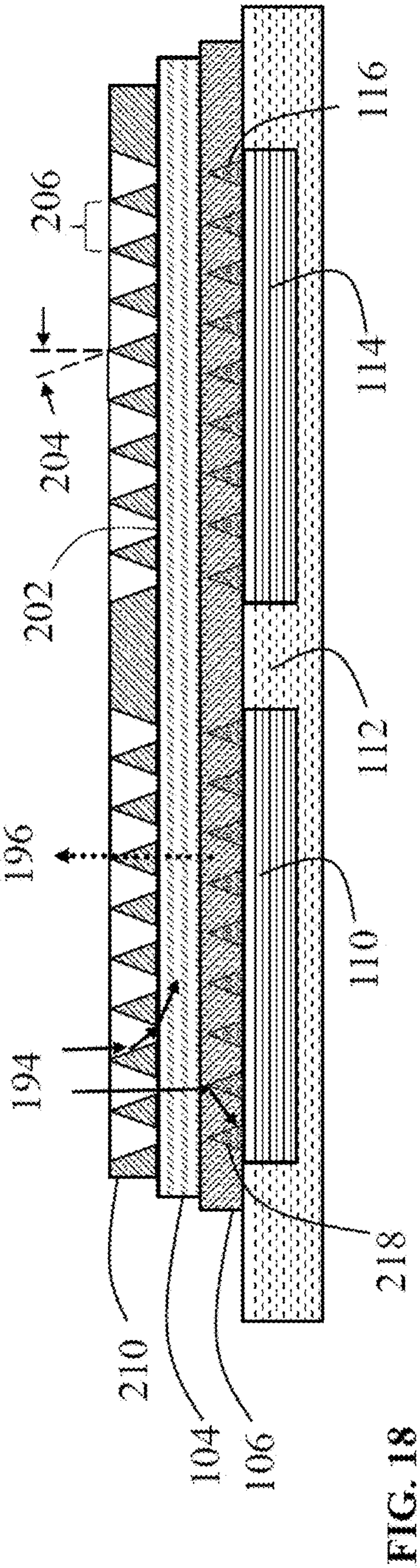
FIG. 18 shows a cross section of a further improvement to the detector of FIG. 16.

FIG. 18 shows another embodiment of the structure proposed in FIG. 16. The gaps 202 are now bounded by wedge shaped sections of aluminum 210, the wedges having an angle 204 and a pitch 206. Aluminum is a low loss reflector, and the metal also provides a low resistance cathode connection. Other metals and combinations of metals may be used with similar effect, such as nickel, chromium, gold, etc. As can be seen in the diagram, photons 194 will be redirected laterally, both by reflection at the wedge surface, and by refraction at the interface with N type QD film 104. The cathode 210 (102) at the detector exterior surface may be considered a form of a "photon trap", as it is designed to redirect photons 194 into longer paths, where they may be absorbed more efficiently. In FIG. 18, a second "photon trap" at an interior surface is shown at the anode 218 (108) of circuit 110. In the embodiment of FIG. 18, the exterior surface is the cathode 210, and the interior surface is the anode 218 of the detector. This arrangement can be reversed, and other alternative designs are anticipated as well.

Figure 19:
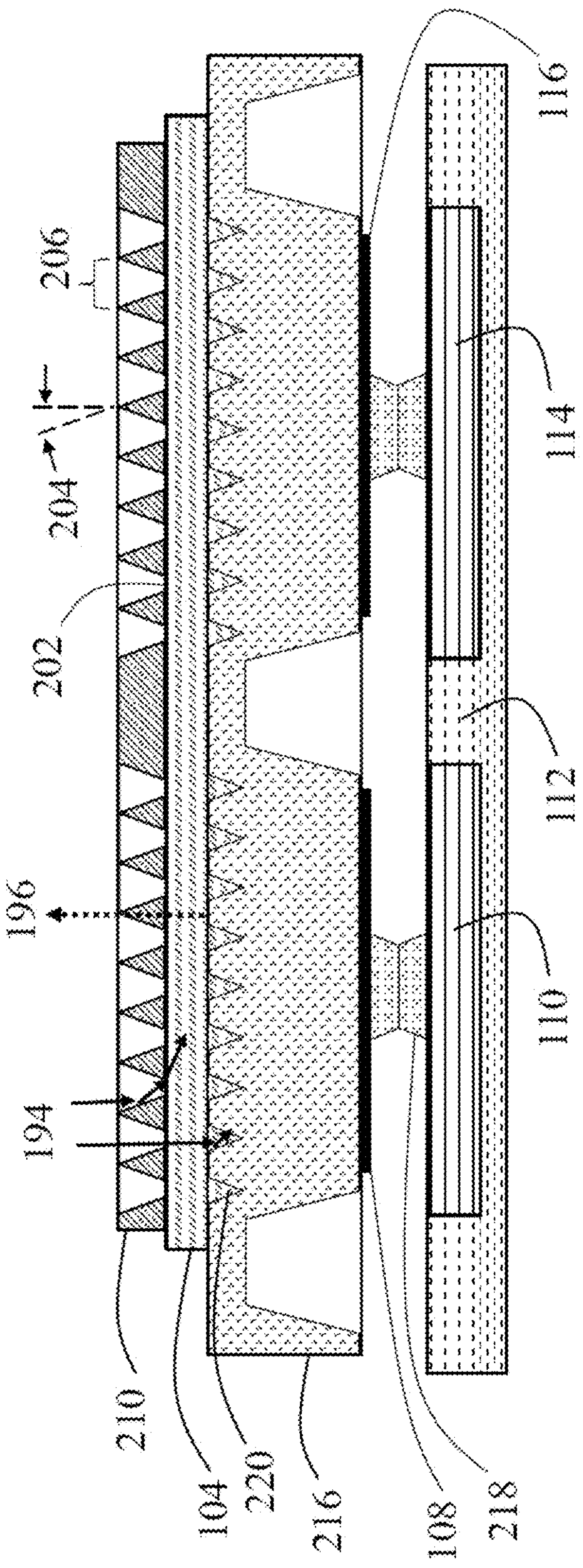
FIG. 19 is an alternative embodiment of the improved detector shown in 18.

FIG. 19 illustrates another embodiment wherein the P type quantum dot film is eliminated. The photon trapping structure 220 is here etched grooves on a P type silicon substrate 216, which forms the other half of the PN detector diode. This design requires two substrates, a first 216 for the detector array, and a second substrate 112 for the ROIC 62. The anode 108 of the first detector is connected to pixel circuit 1 110 of ROIC 62 via conductive metallic bumps 218. Metallic bumps 218 are typically indium, but may be gold, copper, or other suitable metal composition.

Figure 22:
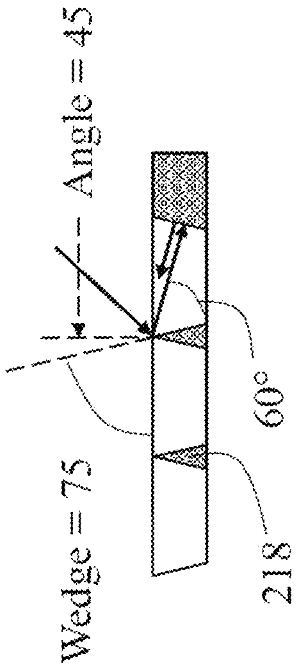
FIGS. 20, 21, 22, and 23 are ray trace analyses of the wedge structures of FIG. 16.
Figure 23:
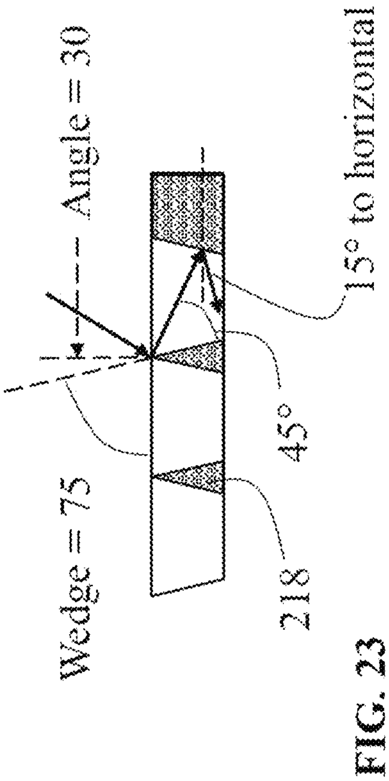
Figure 20:
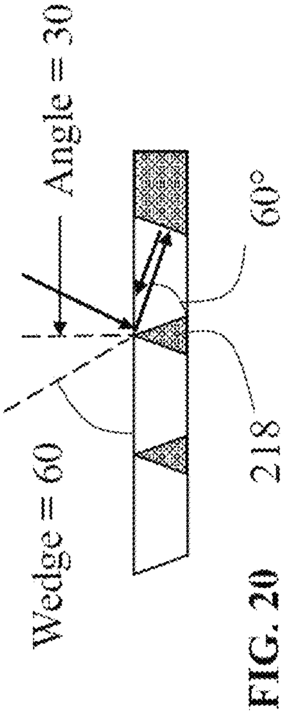
Figure 21:
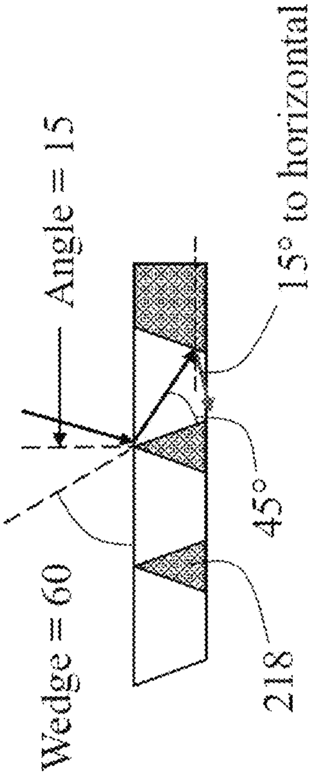
Figure 25:
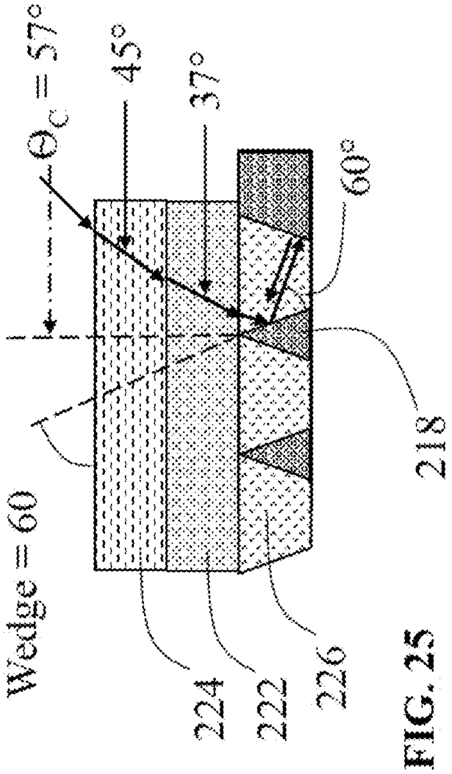
FIGS. 24 and 25 show the effect of dielectric coatings on the wedge structure analysis of FIGS. 20 and 21.
Figure 24:
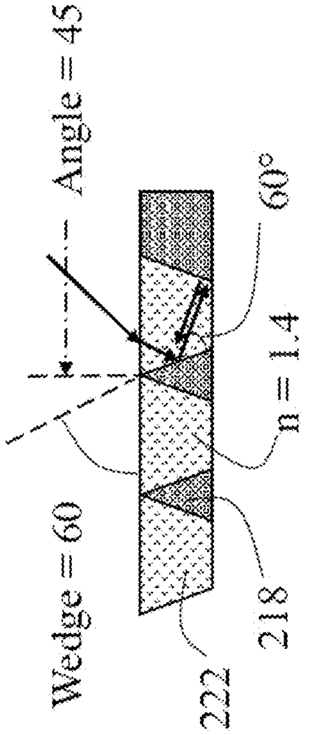

FIG. 20 is an analysis of the critical angle of incidence based on the wedge angle. In this example, a 60° wedge angle means any incident rays greater than 30° will be reflected back towards the source. FIG. 21 shows an incident ray of 15° being redirected in accordance with the design intent. FIG. 22 is an analysis of a 75° wedge 218, with the result being any incident rays above 45° will be reflected back towards the source. FIG. 23 shows an incident ray of 30° being redirected by wedge 218 in accordance with the design intent. FIG. 24 illustrates the beneficial effect of an anti-reflection coating. In this analysis, a dielectric coating with index of refraction 1.4 is used with a wedge angle of 60°. It can be seen the maximum incident ray angle is now increased to 45° from the 30° when no AR coating is applied. FIG. 25 shows the further benefits of a multi-layer AR coating, with the maximum incident ray increased to 57°. In this example first layer 226 is n=1.67, second layer 222 is n=1.4, and third layer 224 is n=1.18.

Figure 26:
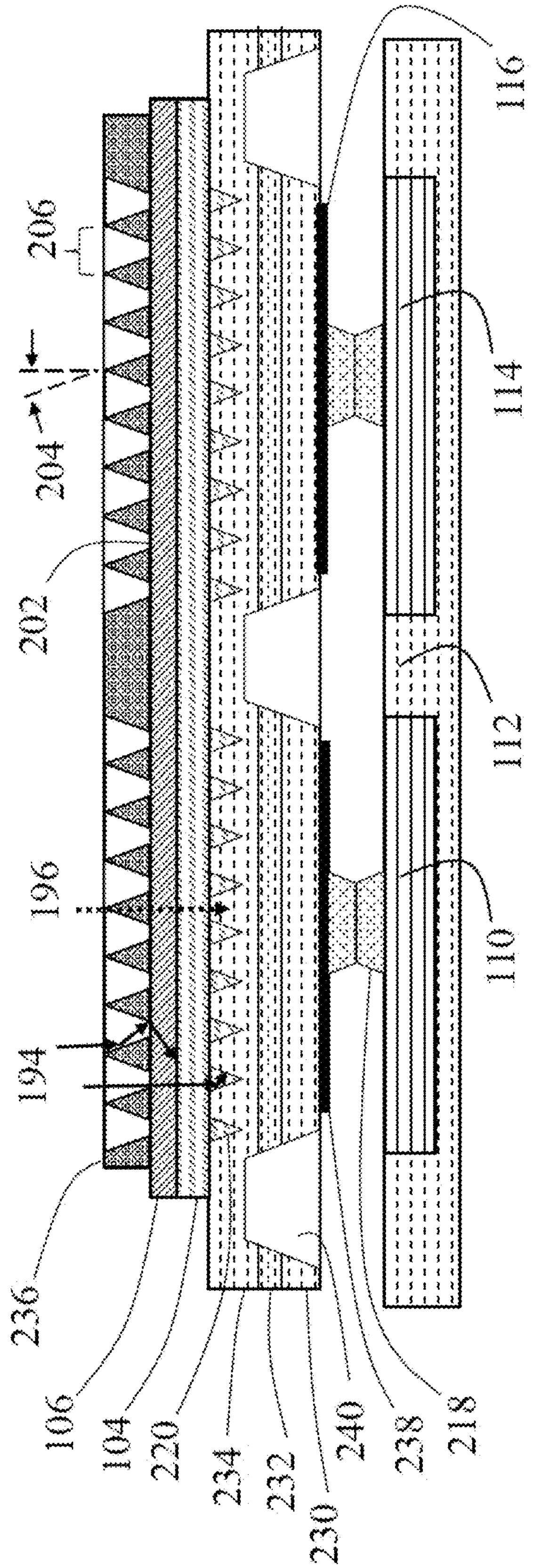
FIG. 26 is a cross section view of an avalanche photodetector formed by P and N type quantum dot layers on an N type silicon substrate.
Figure 27:
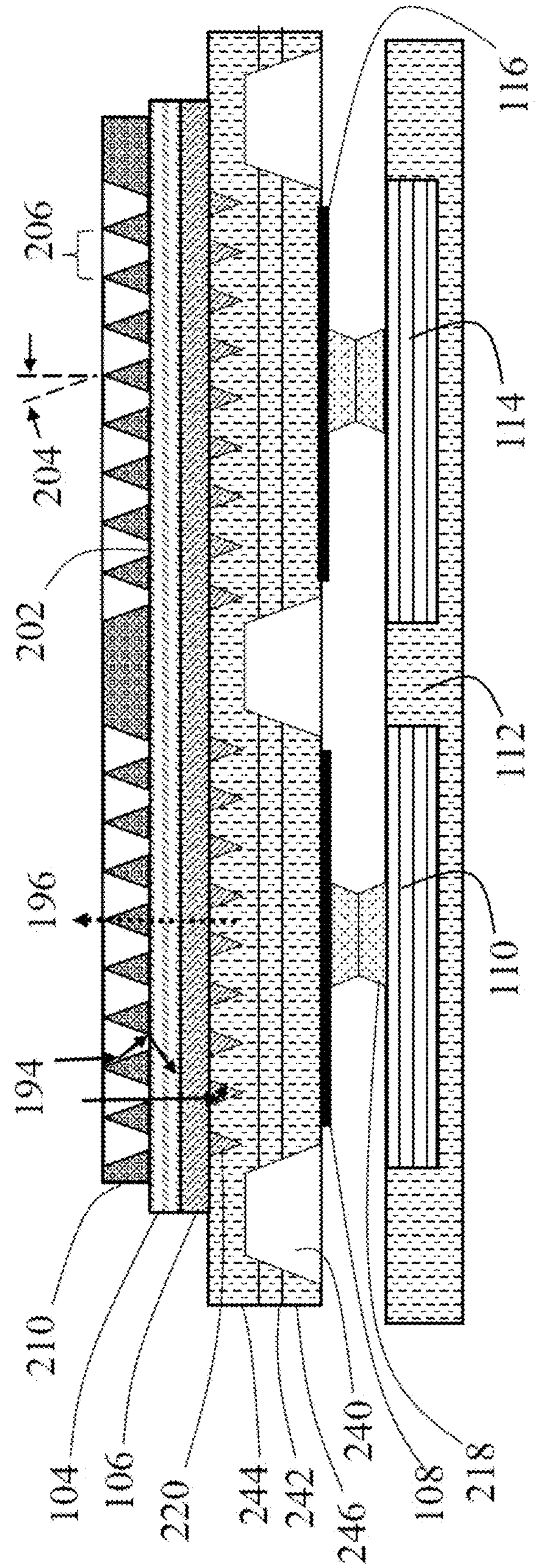
FIG. 27 is a cross section view of an avalanche photodetector formed by N and P type quantum dot layers on a P type silicon substrate.
Figure 28:
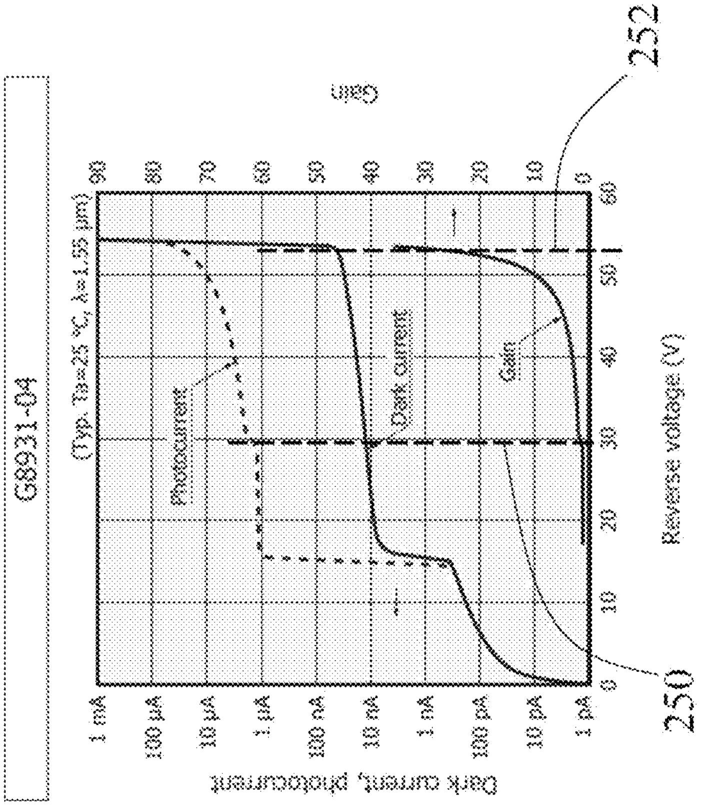
FIG. 28 is a reference diagram showing an I-V curve and the three regions of operation which may be used by an APD detector of the type described on FIG. 26 or 27.

FIG. 26 shows a structure which addresses the detector capacitance independently. The proposed detector is an avalanche photodetector. The advantage of the APD structure is the removal of the cathode contact to a much greater distance than in the simple PN structures already described. An N type silicon substrate 234 has photon redirecting grooves 220 etched into a top surface. An alternative embodiment to grooves 220 is a dielectric photon redirecting structure applied prior to QD film deposition (not shown). N type 104 and P type 106 QD films are then deposited and the common anode contact 236 fabricated as shown. Substrate 234 is lightly doped and functions as the multiplication region of the APD. A charge layer 232 and an N+ contact region 230 are grown epitaxially and isolation trenches 240 etched prior to fabrication steps on the top surface of the device. The multiplication region 234 can be designed to be much thicker than the PN junction detector thickness, lowering the capacitance significantly. The parallel plate capacitance of the APD is based on the distance between anode 236 and the charge layer 232. This advantage comes at the expense of having to use a much higher bias supply. The APD structure of FIG. 26 addresses both issues of quantum efficiency and capacitance of the QD film based PN detectors, and yields a current multiplication gain of 10-20× in linear operating mode. In order to solve QE and capacitance problems it reverts to a two silicon substrate solution and a secondary hybridization process. FIG. 27 shows another avalanche photodetector. This detector is an alternative to FIG. 26 based on a P type substrate as opposed to N type. A P type silicon substrate 244 has photon redirecting grooves 220 etched into a top surface. An alternative embodiment to grooves 220 is a dielectric photon redirecting structure applied prior to QD film deposition (not shown). P type 106 and N type 104 QD films are then deposited and the cathode contact 210 fabricated as shown. Substrate 244 is lightly doped and functions as the multiplication region of the APD. A charge layer 242 and a P+ contact region 246 are grown epitaxially and isolation trenches 240 etched prior to fabrication steps on the top surface of the device. The multiplication region 244 can be designed to be much thicker than a QD PN junction detector thickness, lowering the capacitance significantly. FIG. 28 is a reference chart showing the regions of operation of an avalanche photodiode. The reference chart is for a Hamamatsu G8931-04 APD, a common communications type APD. Region 1 is to the left of dashed line 250, where the bias voltage for this diode is in the range of ($0<V_B<30$). In region 1, there is no gain, and the device operates in a similar fashion as a reverse biased PN detector. Region 2 is between dashed lines 250 and 252, where the gain is appreciable, and the device operates as a linear mode APD. For this device, Region 2 is in the range of ($30<V_B<52$). To the right of dashed line 252 in Region 3, the gain increases exponentially. The gain in Region 3 may be as high as 10 E+6 in some cases, and the detection of a single photon may be possible. Noise will also be much higher in Region 3, and the probability of a false alarm (FA) increases. False alarms are due to the high gain and higher random noise, which may result in a full scale deflection indistinguishable from a photon-induced event. This Region 3 is typically referred to as "Geiger mode" due to the similar operational characteristics of a Geiger counter radiation monitor, and the device may often be referred to as a SPAD, or single photon avalanched detector when biased in Region 3. The structures of both FIG. 26 and FIG. 27, as well as the device described in FIG. 29 may be operated as APDs or SPADs, per the instant invention.

Figure 29:
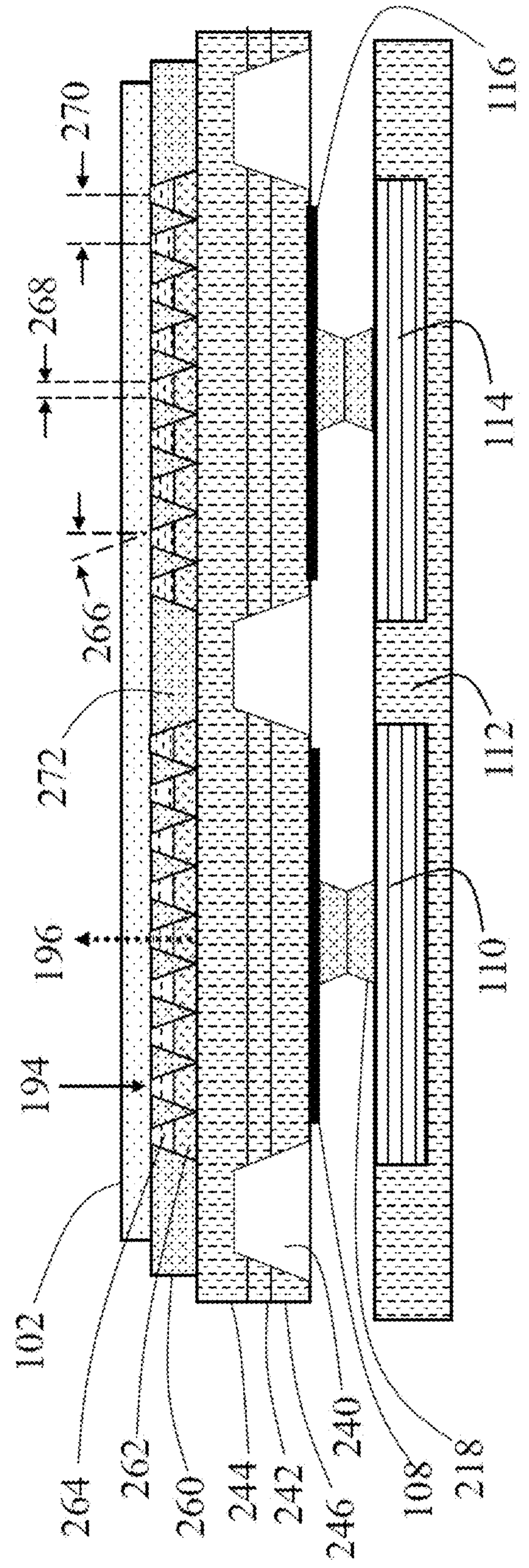
FIG. 29 is another embodiment of a quantum dot detector. In this case the quantum dots are etched in silicon by fine pitch photolithography.

FIG. 29 shows a cross sectional view of a quantum dot array formed by fine line photolithography on the surface of a silicon wafer. Other types of substrate materials may be used, but availability of the latest fine line photolithography (approaching 3 nm) is typically associated with silicon processing. The QDs may need to have minimum features in the 7-12 nm range. The mating circuits 62 will likely be silicon, so it is desirable to use the same material for detector array 60, as CTE matching will allow for low stress wafer bonding processes. The QD array shown has a pillar with an etch angle 266, a width 268, and a pitch 270. The pillars are shown with two regions, P type 262 and N type 260. In one embodiment, the optional epitaxial layer of additional P-type material 262 may be grown on substrate 244. A second epitaxial layer 262 of N type material is then grown atop layer 260. An intermediate layer of undoped material (I layer not shown) may be grown between P type 260 and N type 262 layers. Dielectric 260 is deposited in the gaps and the surface planarized before the common cathode 102 is deposited. Most advantageous is the avalanche photodiode, but a PN junction or PIN photodetector may also be fabricated using the photolithography method described. The photodiode variants can also be realized as NP, NIP, or APD/SPAD on an N type substrate (234). The pillars may be conical in 3D, or may be pyramids in 3D. The conical geometry offers a lower fill factor, but a narrower set of resonances. The choice of a pyramid 3D profile with four flat sides will result in higher fill factor, with broader resonance. The pyramid may be used in a preferred embodiment to enhance quantum efficiency. A narrow band optical filter in the receive optics chain, together with the pyramid 3D profile may allow for both narrow band optical selection, and high quantum efficiency.

In the exemplary embodiments described herein, a number of digital processors have been identified, some associated with the host vehicle, some associated with the ladar subsystem, and some associated with the individual ladar sensors. The partitioning and the naming of these various digital processors has been based on experience and tradition, but other partitioning and naming conventions may be used without changing the scope, intent, or affecting the utility of the invention. Those processors associated with the vehicle CPU and the collision processor and airbag control unit may be combined in some future embodiments. The ladar system controller including an object tracking and scene processor, and a control processor may in some alternative embodiments be eliminated as a circuit, and the functions normally performed by ladar system controller as described herein as contemplated for use with the present invention would then be assumed by a more powerful vehicle CPU. This would follow a trend toward greater centralization of the computing power in the vehicle. A trend towards decentralization may also take place, some alternative embodiments having ever more of the processing power pushed down into the ladar sensor subsystem. In other alternative embodiments, perhaps in a robotic vehicle where only a single ladar sensor might be installed, substantially all of the processing power could be incorporated in the individual ladar sensor itself. The term digital processor may be used generically to describe either digital controllers or digital computers, as many controllers may also perform pure mathematical computations, or perform data reduction, and since many digital computers may also perform control operations. Whether a digital processor is termed a controller or a computer is a descriptive distinction, and not meant to limit the application or function of either device.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A vehicle including:
- an inertial reference subsystem; and
- at least one visible light camera and
- a vehicular ladar sensor comprising
- a laser having a modulated laser light output operable at a certain wavelength,
- and at least one optical element adapted to receive the modulated laser light output and illuminate a field of view,
- a transparent surface disposed between the optical element and the field of view and capable of transmitting the modulated laser light at the certain wavelength,
- a two-dimensional array of light sensitive detectors positioned at a focal plane of a light collecting and focusing system, each of said light sensitive detectors having an output producing an electrical response signal from a reflected portion of the modulated laser light output,
- wherein said two-dimensional array of light sensitive detectors has an exterior surface, at least one quantum dot region, and an interior surface, and
- wherein at least one of said exterior surface and interior surface has a photon redirecting structure, the photon redirecting structure being configured to redirect, by reflection or refraction, at least a portion of incident photons into a longer path through the at least one quantum dot region than the path the photons would traverse absent the photon redirecting structure,
- a readout integrated circuit with a plurality of unit cell electrical circuits, each of said unit cell electrical circuits having an input connected to one of said light sensitive detector outputs, each said unit cell electrical circuit having an electrical response signal demodulator and a range measuring circuit connected to an output of said electrical response signal demodulator, said range measuring circuit further connected to a reference signal providing a zero range reference for the modulated laser light output,
- a detector bias circuit connected to at least one voltage distribution grid of said array of light sensitive detectors, and a temperature stabilized frequency reference.

2. The vehicle as set forth in claim 1, wherein said exterior surface is a common cathode of the two-dimensional array of light sensitive detectors.

3. The vehicle as set forth in claim 1, wherein said exterior surface is a common anode of the two-dimensional array of light sensitive detectors.

4. The vehicle as set forth in claim 1 wherein said interior surface is an isolated terminal of a light sensitive detector selected from the set of; an anode, and a cathode.

5. The vehicle as set forth in claim 1 wherein said quantum dot region is a colloidal quantum dot film.

6. The vehicle as set forth in claim 1 wherein said light sensitive detector is a structure selected from the set of; a PN detector, a PIN detector, an avalanche photodetector, and a single-photon avalanche detector.

7. The vehicle as set forth in claim 1 wherein said quantum dot region is densified by at least one of an applied electric field, an applied partial vacuum, an applied force of acceleration, and surface activation.

8. The vehicle as set forth in claim 1 wherein said quantum dot region is formed by photolithography.

9. The vehicle as set forth in claim 1 wherein said photon redirecting structure is formed in a material selected from the set of; a transparent conductor, and a metal.

10. A vehicle including:
- an inertial reference subsystem;
- at least one visible light camera; and
- a vehicular ladar sensor comprising
- a light source configured to generate a modulated illuminating light,
- a scanning mechanism configured to receive the illuminating light generated by said light source and selectively direct the illuminating light into a portion of a field of view;
- an optical sampler adapted to direct a portion of said illuminating light onto a photodetector,
- a circuit connected to said photodetector and adapted to provide a zero time reference,
- a receiving lens assembly for receiving the illuminating light reflected off an object in the field of view;
- a plurality of quantum dot photodiodes arranged in a two dimensional array, wherein each photodiode is configured to receive light from said receiving lens assembly,
- a bias circuit electrically connected to each photodiode,
- each of said quantum dot photodiodes with an output producing an electrical response signal from the reflected portion of the illuminating light,
- wherein each of said quantum dot photodiodes has an exterior surface, at least one quantum dot region, and an interior surface,
- wherein at least one of said exterior and interior surfaces has a photon redirecting structure, the photon redirecting structure being configured to redirect, by reflection or refraction, at least a portion of incident photons into a longer path through the at least one quantum dot region than the path the photons would traverse absent the photon redirecting structure, and
- a readout integrated circuit with a plurality of unit cell electrical circuits, each of said unit cell electrical circuits having an input connected to one of said quantum dot photodiode outputs, each unit cell electrical circuit having an electrical response signal demodulator and a range measuring circuit connected to an output of said electrical response signal demodulator, said range measuring circuit further connected to said reference signal providing a zero time reference for the modulated laser light output.

11. The vehicle as set forth in claim 10, wherein said scanning mechanism includes a MEMS device.

12. The vehicle as set forth in claim 10 wherein said exterior surface is a common cathode of said plurality of quantum dot photodiodes.

13. The vehicle as set forth in claim 10 wherein said exterior surface is a common anode of said plurality of quantum dot photodiodes.

14. The vehicle as set forth in claim 10 wherein said interior surface is an isolated terminal of a photodiode.

15. The vehicle as set forth in claim 10 wherein said quantum dot region is a colloidal quantum dot film.

16. The vehicle as set forth in claim 10 wherein said photodiode is a PIN detector.

17. The vehicle as set forth in claim 10 wherein said quantum dot region is densified by at least one of an applied electric field, an applied partial vacuum, an applied force of acceleration, and surface activation.

18. The vehicle as set forth in claim 10 wherein said quantum dot region is formed by photolithography.

19. The vehicle as set forth in claim 10 wherein said photon redirecting structure is formed in a material selected from the set of; a transparent conductor, and a metal.

20. A vehicular ladar sensor comprising:

a laser with a wavelength of operation having a modulated laser light output, at least one optical element adapted to illuminate a selected field of view, a two-dimensional array of light sensitive detectors positioned at a focal plane of a light collecting and focusing system, each of said light sensitive detectors with an output producing an electrical response signal from a reflected portion of said modulated laser light output, wherein said two-dimensional array of light sensitive detectors has an exterior surface, at least one quantum dot region, and an interior surface, wherein at least one of said exterior and interior surfaces has a photon redirecting structure, the photon redirecting structure being configured to redirect, by reflection or refraction, at least a portion of incident photons into a longer path through the at least one quantum dot region than the path the photons would traverse absent the photon redirecting structure, a readout integrated circuit with a plurality of unit cell electrical circuits, each of said unit cell electrical circuits having an input connected to one of said light sensitive detector outputs, each said unit cell electrical circuit having an electrical response signal demodulator and a range measuring circuit connected to an output of said electrical response signal demodulator, said range measuring circuit further connected to a reference signal providing a zero range reference for the modulated laser light output, a detector bias circuit connected to at least one voltage distribution grid of said array of light sensitive detectors, and a temperature stabilized frequency reference, and at least one transparent surface capable of transmitting light at the wavelength of operation.

* * * * *